(12) United States Patent
Tanaka et al.

(10) Patent No.: US 11,308,670 B2
(45) Date of Patent: *Apr. 19, 2022

(54) IMAGE PROCESSING APPARATUS AND METHOD

(71) Applicant: SONY CORPORATION, Tokyo (JP)

(72) Inventors: Kenji Tanaka, Kanagawa (JP); Satoshi Ihara, Kanagawa (JP); Cody Poultney, Ontario (CA)

(73) Assignee: SONY CORPORATION, Tokyo (JP)

( * ) Notice: Subject to any disclaimer, the term of this patent is extended or adjusted under 35 U.S.C. 154(b) by 61 days.

This patent is subject to a terminal disclaimer.

(21) Appl. No.: 16/494,063

(22) PCT Filed: Mar. 9, 2018

(86) PCT No.: PCT/JP2018/009146
§ 371 (c)(1),
(2) Date: Sep. 13, 2019

(87) PCT Pub. No.: WO2018/173790
PCT Pub. Date: Sep. 27, 2018

(65) Prior Publication Data
US 2021/0125388 A1   Apr. 29, 2021

(30) Foreign Application Priority Data

Mar. 22, 2017 (JP) .............................. JP2017-055995

(51) Int. Cl.
*G06T 11/60* (2006.01)
*G06F 3/0484* (2013.01)
(Continued)

(52) U.S. Cl.
CPC .......... *G06T 11/60* (2013.01); *G06F 3/04845* (2013.01); *G06F 3/0482* (2013.01)

(58) Field of Classification Search
CPC ..... G06T 11/60; G06F 3/04845; G06F 3/0482
See application file for complete search history.

(56) References Cited

U.S. PATENT DOCUMENTS 6,037,882 A * 3/2000 Levy ...................... G06F 3/017
341/20
10,469,744 B2 * 11/2019 Yim ................... H04N 5/23238
(Continued)

FOREIGN PATENT DOCUMENTS

CN         106023241 A      10/2016
CN         205845105 U      12/2016
(Continued)

OTHER PUBLICATIONS

International Search Report and Written Opinion of PCT Application No. PCT/JP2018/009146, dated Jun. 5, 2018, 09 pages of ISRWO.
(Continued)

*Primary Examiner* — Daeho D Song
(74) *Attorney, Agent, or Firm* — Chip Law Group

(57) ABSTRACT

The present technology relates to an image processing apparatus and method, and a program that are capable of more facilitating editing. The image processing apparatus includes: an operation detection unit configured to detect an operation input by an operation unit; and a display control unit configured to output, to an immersive presentation device, part or entirety of a spherical image on which an image of the operation unit is superimposed, as a presentation image, to cause the immersive presentation device to display the presentation image, the display control unit being configured to control, in a case where the operation input has been detected, the display of the presentation image such that the operation input is reflected. The present technology is applicable to an editing system.

11 Claims, 15 Drawing Sheets

(51) Int. Cl.
  *G06F 3/04845* (2022.01)
  *G06F 3/0482* (2013.01)

(56) References Cited

U.S. PATENT DOCUMENTS

| | | | | |
|---|---|---|---|---|
| 11,070,724 B2* | 7/2021 | Ihara | ............... | G06F 3/04845 |
| 2013/0231184 A1* | 9/2013 | Hatanaka | ............... | A63F 13/219 |
| | | | | 463/32 |
| 2015/0358613 A1* | 12/2015 | Sandrew | ............... | G06T 15/205 |
| | | | | 348/36 |
| 2016/0041388 A1* | 2/2016 | Fujimaki | ............... | G02B 27/017 |
| | | | | 345/2.1 |
| 2016/0042567 A1* | 2/2016 | Shuster | ............... | G06T 19/20 |
| | | | | 345/633 |
| 2016/0054565 A1* | 2/2016 | Izumihara | ............... | G02B 27/017 |
| | | | | 345/8 |
| 2016/0225156 A1* | 8/2016 | Ikenoue | ............... | G06T 7/246 |
| 2016/0321940 A1* | 11/2016 | Banga | ............... | G09B 9/05 |
| 2016/0353062 A1* | 12/2016 | Ono | ............... | G02B 27/0093 |
| 2017/0045443 A1* | 2/2017 | Wang | ............... | G01N 33/225 |
| 2017/0076429 A1* | 3/2017 | Russell | ............... | G03B 37/04 |
| 2017/0083104 A1* | 3/2017 | Namba | ............... | G02B 27/017 |
| 2017/0148339 A1* | 5/2017 | Van Curen | ............... | H04N 13/271 |
| 2017/0285734 A1* | 10/2017 | Saito | ............... | G06T 19/006 |
| 2017/0308258 A1* | 10/2017 | Xu | ............... | G06T 7/70 |
| 2017/0358140 A1* | 12/2017 | Kohler | ............... | G02B 27/0093 |
| 2018/0053337 A1* | 2/2018 | Nakashima | ............... | H04N 13/344 |
| 2018/0075635 A1* | 3/2018 | Choi | ............... | H04N 13/106 |
| 2018/0122042 A1* | 5/2018 | Kim | ............... | G06F 3/0346 |
| 2018/0130264 A1* | 5/2018 | Ebacher | ............... | G06F 3/04815 |
| 2018/0152636 A1* | 5/2018 | Yim | ............... | H04N 5/2628 |
| 2018/0157344 A1* | 6/2018 | Toff | ............... | G06F 3/017 |
| 2018/0158250 A1* | 6/2018 | Yamamoto | ............... | G06T 19/20 |
| 2018/0217393 A1* | 8/2018 | Richards | ............... | H01L 27/3293 |
| 2018/0232047 A1* | 8/2018 | Yoon | ............... | G06T 7/80 |
| 2018/0246565 A1* | 8/2018 | Moon | ............... | G06F 3/012 |
| 2018/0275764 A1* | 9/2018 | Lee | ............... | G06K 9/00355 |
| 2020/0077021 A1* | 3/2020 | Ihara | ............... | G06F 3/0488 |

FOREIGN PATENT DOCUMENTS

| | | | |
|---|---|---|---|
| CN | 106291930 | A | 1/2017 |
| CN | 106484085 | A | 3/2017 |
| EP | 3110141 | A1 | 12/2016 |
| JP | 2003-143579 | A | 5/2003 |
| JP | 2014-165764 | A | 9/2014 |
| JP | 2016-092642 | A | 5/2016 |
| JP | 2016-139375 | A | 8/2016 |
| JP | 2016139375 | A | 8/2016 |
| JP | 2016-206447 | A | 12/2016 |
| JP | 2016-218366 | A | 12/2016 |
| JP | 2016-225967 | A | 12/2016 |
| JP | 2016201777 | A | 12/2016 |
| JP | 2017-054201 | A | 3/2017 |
| JP | 6093473 | B1 | 3/2017 |
| JP | 2017045443 | A | 3/2017 |
| JP | 2017054201 | A | 10/2017 |
| JP | 2018028834 | A | 2/2018 |
| WO | 2015/125375 | A1 | 8/2015 |
| WO | 2017014359 | A1 | 1/2017 |

OTHER PUBLICATIONS

Second Office Action for CN Application No. 201880017796.8 dated Sep. 9, 2021.

Office Action for CN Application No. 201880017796.8 dated Jun. 28, 2021, 8 pages of OA, 12 pages of translation.

King et al., "A Survey of Augmented Reality Technology", Computer Measurement and Control, 2017, Translation of Abstract only, pp. 8.

* cited by examiner

IMAGE PROCESSING APPARATUS AND METHOD

CROSS REFERENCE TO RELATED APPLICATIONS

This application is a U.S. National Phase of International Patent Application No. PCT/JP2018/009146 filed on Mar. 9, 2018, which claims priority benefit of Japanese Patent Application No. JP 2017-055995 filed in the Japan Patent Office on Mar. 22, 2017. Each of the above-referenced applications is hereby incorporated herein by reference in its entirety.

TECHNICAL FIELD

The present technology relates to an image processing apparatus and a method, and a program, and particularly to an image processing apparatus and a method, and a program that are capable of more facilitating editing.

BACKGROUND ART

Conventionally, there has been known omnidirectional images as 360-degree omnidirectional images (see, for example, Patent Document 1). Such omnidirectional images include spherical images that are omnidirectional images in 360-degree directions, that is, horizontal and vertical directions. The user can view the content of a spherical image, with, for example, a head mounted display utilizing virtual reality (VR) technology.

Furthermore, a spherical image is generated with stitching processing on which a plurality of wide-angle images obtained by image capturing with a plurality of cameras is stitched together. Then, the spherical image obtained with the stitching processing is edited to generate the content of the final spherical image.

CITATION LIST

Patent Document

Patent Document 1: Japanese Patent Application Laid-Open No. 2003-143579

SUMMARY OF THE INVENTION

Problems to be Solved by the Invention

Editing of spherical images, however, has been uneasy.

In other words, the editor performs editing work while displaying, on a display, an equidistant cylindrical (equirectangular) two-dimensional spherical image obtained by equidistant cylindrical projection. Thereafter, the editor actually displays, on a head mounted display, the spherical image obtained by the editing, to verify the editing details and the like.

At this time, in a case where correction of the editing details or further editing is required, the editor removes the head mounted display from the editor's own head, and further displays the equirectangular two-dimensional spherical image on the display to perform editing work.

As described above, the editor has to remove the head mounted display every time the edited spherical image is verified, at editing of the spherical image, so that the removal is troublesome.

The present technology has been made in view of such a situation, and makes more facilitative editing possible.

Solutions to Problems

An image processing apparatus according to one aspect of the present technology includes: an operation detection unit configured to detect an operation input by an operation unit; and a display control unit configured to output, to an immersive presentation device, part or entirety of a spherical image on which an image of the operation unit is superimposed, as a presentation image, to cause the immersive presentation device to display the presentation image, the display control unit being configured to control, in a case where the operation input has been detected, the display of the presentation image such that the operation input is reflected.

The operation detection unit is allowed to detect the operation input regarding editing of the spherical image.

The image processing apparatus can be further provided with an image processing unit configured to generate the image of the operation unit, on the basis of a captured image of the operation unit captured as a subject.

The display control unit is allowed to cause the image of the operation unit to be displayed at a position on the spherical image defined by a position and orientation of the immersive presentation device.

The image processing apparatus can be further provided with an image processing unit configured to generate an image of a model of the operation unit, as the image of the operation unit.

The display control unit is allowed to cause the image of the operation unit to be displayed at a position on the spherical image defined by a position and orientation of the operation unit.

An auxiliary screen for editing the spherical image is allowed to be further displayed on the presentation image.

The auxiliary screen is allowed to be displayed at a defined position on the presentation image.

The auxiliary screen is allowed to be displayed at a position on the presentation image defined by a position and orientation of the immersive presentation device.

The image processing apparatus can be further provided with a communication unit configured to output the presentation image to a plurality of the immersive presentation devices.

The image processing method or program according to one aspect of the present technology includes the steps of: detecting an operation input by an operation unit; and outputting, to an immersive presentation device, part or entirety of a spherical image on which an image of the operation unit is superimposed, as a presentation image, to cause the immersive presentation device to display the presentation image, and controlling, in a case where the operation input has been detected, the display of the presentation image such that the operation input is reflected.

In one aspect of the present technology, an operation input by an operation unit is detected; and part or entirety of a spherical image on which an image of the operation unit is superimposed is output as a presentation image to an immersive presentation device and the presentation image is displayed on the immersive presentation device, and in a case where the operation input has been detected, the display of the presentation image is controlled such that the operation input is reflected.

Effects of the Invention

According to one aspect of the present technology, editing can be performed more easily.

Note that the effects described herein are not necessarily limited, and any of the effects described in the present disclosure may be applied.

MODE FOR CARRYING OUT THE INVENTION

Hereinafter, an embodiment with the present technology applied will be described with reference to the drawings.

First Embodiment

<Exemplary Configuration of Editing System>

The present technology relates to editing and authoring of VR content, in particular, of a spherical image, and relates to a technology of editing a spherical image obtained with stitching processing to generate completed content referred to as a so-called complete package. Note that the spherical image may be a still image or a moving image; however, in the following, the description will be continued assuming that the spherical image is a moving image.

Figure 1:
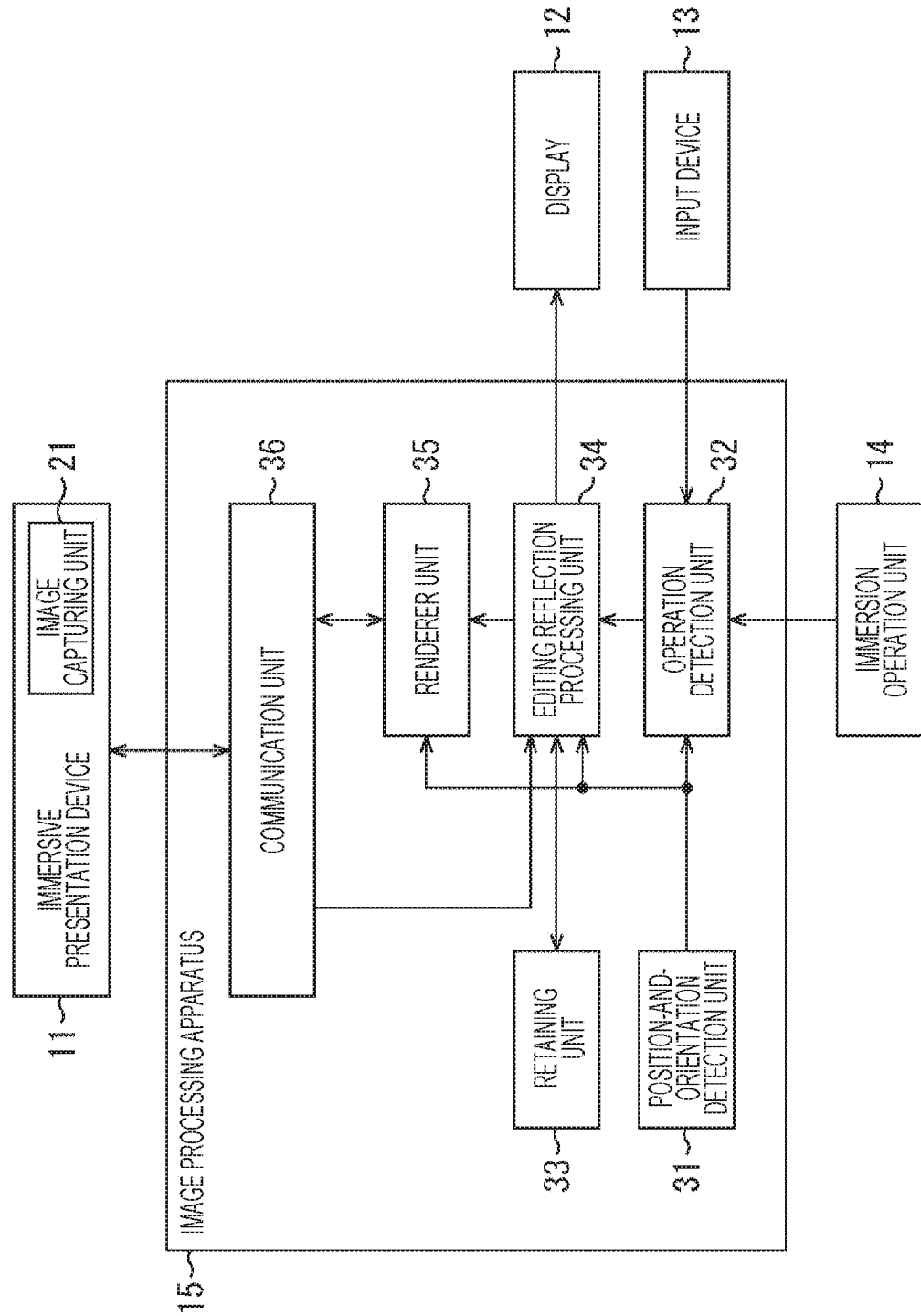
FIG. 1 is a block diagram of an exemplary configuration of an editing system.

FIG. 1 is a block diagram of an exemplary configuration of one embodiment of an editing system with the present technology applied.

The editing system illustrated in FIG. 1 includes an immersive presentation device 11, a display 12, an input device 13, an immersion operation unit 14, and an image processing apparatus 15.

For this editing system, the user wears the immersive presentation device 11 on the head, operates the input device 13 and the immersion operation unit 14 while verifying, in real time, a spherical image presented (displayed) by the immersive presentation device 11, and edits the spherical image.

At this time, for example, the user as an editor wears the immersive presentation device 11 on the head to preview and edit the spherical image, and the display 12 is disposed such that a user different from the editor can also verify the editing of the spherical image. In other words, the display 12 appropriately displays a screen regarding the editing of the spherical image, and thus the user different from the editor can verify the editing by viewing the display of the display 12.

The immersive presentation device 11 includes, for example, a head mounted display, and displays a spherical image supplied from the image processing apparatus 15.

Note that, a case where the immersive presentation device 11 is a head mounted display wearable on the user's head will be described as an example below. The immersive presentation device 11, however, may be any device reproducible a spherical image.

As an example of the immersive presentation device 11, there also can be adopted an immersive display surrounding the user, such as a cave automatic virtual environment (CAVE) type display including a plurality of flat display units or a display including a curved display unit having, for example, a dome shape. Besides, the display unit of the immersive presentation device 11 may be a translucent transmission display unit or a non-transmission display unit.

The immersive presentation device 11 includes an image capturing unit 21, and the image capturing unit 21 captures an image in front of the immersive presentation device 11. The captured image obtained by image capturing by the image capturing unit 21 is an image including, as a subject, a portion in front of the user with the immersive presentation device 11 worn, particularly, a portion at hand of the user where the input device 13 is located.

The immersive presentation device 11 supplies the captured image obtained by the image capturing unit 21 and position-and-orientation information indicating the position and orientation of the immersive presentation device 11 in the three-dimensional space, in other words, in the real space, to the image processing apparatus 15.

The display 12 includes, for example, a liquid crystal display device, and appropriately displays an image supplied from the image processing apparatus 15.

The input device 13 includes, for example, a keyboard, a mouse, and a pen tablet, and supplies a signal in response to an operation of the user as an editor to the image processing apparatus 15.

The immersion operation unit 14 includes, for example, a dedicated controller for reproducing and editing a spherical image, a controller of a game console, or a pen-type input device such as a pen of a pen tablet. For example, a dedicated controller as the immersion operation unit 14 is provided with a button, a touch pad, and the like. Furthermore, a user's own hand can also be used as the immersion operation unit 14.

The immersion operation unit 14 receives an operation by the user as the editor, and supplies a signal in response to the operation to the image processing apparatus 15.

The image processing apparatus 15 controls the entire editing system. The image processing apparatus 15 includes a position-and-orientation detection unit 31, an operation detection unit 32, a retaining unit 33, an editing reflection processing unit 34, a renderer unit 35, and a communication unit 36.

At least part of the position-and-orientation detection unit 31 to the communication unit 36 is achieved with editing software capable of editing and previewing a spherical image, and outputting the spherical image obtained by the editing, in a desired format.

The position-and-orientation detection unit 31 detects the position and orientation of the immersion operation unit 14 in the three-dimensional space, in other words, in the real space, and supplies position-and-orientation information indicating the result of the detection, to the operation detection unit 32, the editing reflection processing unit 34, and the renderer unit 35.

For example, for a dedicated controller as the immersion operation unit 14, the immersion operation unit 14 incorporates a plurality of sensors, and a detecting unit (not illustrated) receives an output from each sensor of the immersion operation unit 14 to detect the position and orientation of the immersion operation unit 14. In such a case, the position-and-orientation detection unit 31 acquires information indicating the position and orientation of the immersion operation unit 14 from the detecting unit, to detect the position and orientation of the immersion operation unit 14.

Besides, for example, a plurality of cameras or the like included in the position-and-orientation detection unit 31 may be used to detect the position and orientation of the user's hand or the pen-type input device as the immersion operation unit 14. Moreover, for example, the position-and-orientation detection unit 31 may detect the position and orientation of the user's hand as the immersion operation unit 14, on the basis of an output of a sensor attached to the user's hand.

The operation detection unit 32 detects a user's operation input on the basis of the signals supplied from the input device 13 and the immersion operation unit 14, and the position-and-orientation information supplied from the position-and-orientation detection unit 31. The operation detection unit 32 supplies operation-detection information indicating the result of the detection of the operation input by the user, to the editing reflection processing unit 34.

The retaining unit 33 retains a spherical image to be edited, and supplies the retained spherical image to the editing reflection processing unit 34 and retains a spherical image supplied from the editing reflection processing unit 34.

Here, the spherical image retained by the retaining unit 33 is, for example, an image obtained by mapping an equidistant cylindrical (equirectangular) two-dimensional spherical image onto the inner face of a sphere or an inner face of a cube in a 3D model.

Note that the spherical image retained by the retaining unit 33 can be a stereoscopic 3D image including an image for the left eye and an image for the right eye mutually having parallax, that is, a 3D volumetric image.

The editing reflection processing unit 34 reads a spherical image from the retaining unit 33, and performs editing processing on the read spherical image, in accordance with operation-detection information supplied from the operation detection unit 32, and supplies the resultant edited spherical image to the renderer unit 35.

Furthermore, the editing reflection processing unit 34 generates an immersion-operation-unit model image imitating the immersion operation unit 14, on the basis of the position-and-orientation information supplied from the position-and-orientation detection unit 31, and supplies the image to the renderer unit 35.

For example, the immersion-operation-unit model image is an image of the immersion operation unit 14 generated by 3D modelling, that is, an image of a model of the immersion operation unit 14. The model of the immersion operation unit 14 represented by the immersion-operation-unit model image is identical in orientation to the actual immersion operation unit 14.

Moreover, the editing reflection processing unit 34 generates a user interface (UI) image for editing and reproducing a spherical image, on the basis of the operation-detection information supplied from the operation detection unit 32 or a captured image supplied from the immersive presentation device 11 through the communication unit 36, and supplies the generated image to the renderer unit 35.

Part of the UI image is also supplied from the editing reflection processing unit 34 to the display 12 as necessary, and displayed by the display 12.

The renderer unit 35 performs rendering processing, on the basis of the position-and-orientation information supplied from the immersive presentation device 11 through the communication unit 36, and the position-and-orientation information supplied from the position-and-orientation detection unit 31.

In other words, the renderer unit 35 generates a spherical image for presentation as an image for presentation, on the basis of the position-and-orientation information from the immersive presentation device 11 and the position-and-orientation information from the immersion operation unit 14, the spherical image, the immersion-operation-unit model image, and the UI image supplied from the editing reflection processing unit 34.

In the rendering processing, the renderer unit 35 superimposes the immersion-operation-unit model image and the UI image on a suitable position on the spherical image, on the basis of the position-and-orientation information from the immersive presentation device 11 and the position-and-orientation information from the immersion operation unit 14, to generate the spherical image for presentation.

Note that, the spherical image for presentation is not limited to an image obtained by superimposing an immersion-operation-unit model image and a UI image on a spherical image, and may be an image obtained by superimposing an immersion-operation-unit model image and a UI image on an image of a partial region of a spherical image. That is to say, an image of a partial or entire region of a spherical image having an immersion-operation-unit model image and a UI image superimposed thereon can be regarded as a spherical image for presentation.

Furthermore, the renderer unit 35 converts, as necessary, the spherical image for presentation into image data in a format that can be handled by the immersive presentation device 11, such as equirectangular image data format, and supplies the resultant obtained spherical image for presentation to the communication unit 36.

The communication unit 36 communicates with the immersive presentation device 11 wiredly or wirelessly. For example, the communication unit 36 outputs, to the immersive presentation device 11, the spherical image for presentation supplied from the renderer unit 35, supplies, to the renderer unit 35, the position-and-orientation information supplied from the immersive presentation device 11, and supplies, to the editing reflection processing unit 34, the captured image supplied from the immersive presentation device 11.

Furthermore, the communication unit 36 is capable of outputting the spherical image for presentation to an immersive presentation device different from the immersive presentation device 21.

For example, it is assumed that one or a plurality of users different from the user as the editor with the immersive presentation device 11 worn is present at an identical place where the user is present or a place away from the user, and the one or plurality of users also each are wearing an immersive presentation device.

In this case, if a spherical image for presentation identical to a spherical image for presentation that is output to the immersive presentation device 11 by the communication unit 36 is also output to the immersive presentation device worn by the one or plurality of users different from the editor, the one or plurality of users and the editor can simultaneously view the identical spherical image for presentation.

For the editing system illustrated in FIG. 1, the spherical image for presentation output from the renderer unit 35 is supplied to the immersive presentation device 11 through the communication unit 36 and displayed. Furthermore, after the operation input regarding editing of the spherical image by the user is performed, the spherical image for presentation on which the operation input is immediately (in real time) reflected is output from the renderer unit 35.

Thus, the renderer unit 35 outputs (supplies) the spherical image for presentation to the immersive presentation device 11, so that the renderer unit 35 can function as a display control unit that controls display of the spherical image for presentation at the immersive presentation device 11.

Furthermore, the editing reflection processing unit 34 is capable of functioning as an image processing unit that generates a spherical image, a UI image, and an immersion-operation-unit model image on which an operation regarding editing by the user is reflected in real time.

<Display of Immersion-Operation-Unit Model Image and UI Image>

The editing system described above allows the user (editor) with the immersive presentation device 11 worn to perform all basic pieces of work such as previewing and editing of a spherical image without removing the immersive presentation device 11 from the head.

For example, in a state where the user reproduces a spherical image for presentation with the immersive presentation device 11 worn, when the user moves the user's head, a region in the spherical image for presentation according to an orientation of the user's own head is presented to the user. As a result, the user can feel as if the user were in the space displayed on the spherical image for presentation.

In addition to the spherical image as content itself to be edited, the immersion-operation-unit model image and the UI image described above are superimposed and displayed on the spherical image for presentation.

Furthermore, for example, as a UI image, a see-through window obtained by cutting out part of a captured image, a menu image including menu items for reproducing and editing an spherical image, and an auxiliary window as a window (screen) for reproducing and editing the spherical image and also displayed on the display 12 is displayed on the spherical image for presentation.

Here, there will be described the immersion-operation-unit model image, the see-through window, the menu image, and the auxiliary window.

First, the immersion-operation-unit model image will be described.

Figure 2:
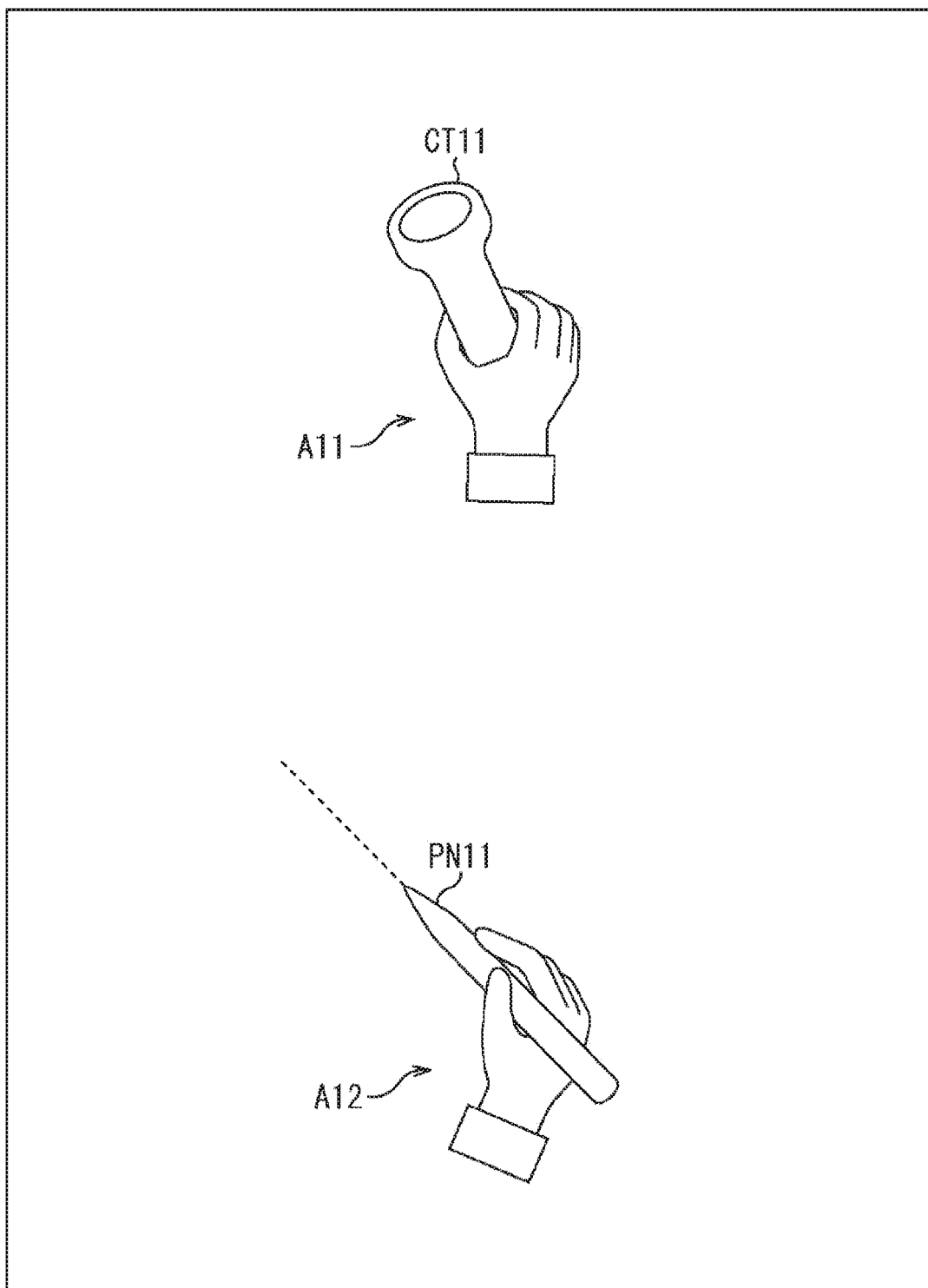
FIG. 2 is an explanatory illustration of an immersion-operation-unit model image.

For example, such as illustrated in FIG. 2, a dedicated controller or pen-type input device may be used as the immersion operation unit 14.

In other words, as indicated by an arrow A11 in FIG. 2, the user may hold, with a hand, a dedicated controller CT11 as the immersion operation unit 14 to perform various operations, or as indicated by an arrow A12, the user may hold, with a hand, a pen-type input device PN11 as the immersion operation unit 14 to perform various operations.

For example, as indicated by the arrow A11, for use of the controller CT11 as the immersion operation unit 14 by the user, in the image processing apparatus 15, the position-and-orientation detection unit 31 tracks the position and orientation of the controller CT11.

Then, an image imitating the controller CT11 is displayed as an immersion-operation-unit model image, on a spherical image for presentation.

At this time, a model of the controller CT11 represented by the immersion-operation-unit model image is displayed at a position and orientation completely identical to the position and orientation of the actual controller CT11.

In other words, with the immersive presentation device 11 worn by the user, a position where the model of the controller CT11 displayed as the immersion-operation-unit model image is present as viewed from the user is referred to as a model presentation position. In this example, the immersion-operation-unit model image is presented to the user as if the model of the controller CT11 is present at the model presentation position.

If the user removes the immersive presentation device 11 from such a state, the actual controller CT11 is visible to the user at the model presentation position.

In such a manner, the display of the immersion-operation-unit model image of the controller CT11 at the orientation completely identical to the orientation of the actual controller CT11, at the position completely identical to the position of the actual controller CT11 allows the user to easily and intuitively perform an operation with the immersion operation unit 14. As a result, work such as editing can be performed more easily.

The editing reflection processing unit 34 generates the immersion-operation-unit model image on the basis of the result of the detection of the position and orientation of the controller CT11 obtained by the position-and-orientation detection unit 31. Furthermore, if the renderer unit 35 refers to position-and-orientation information regarding the controller CT11 supplied from the position-and-orientation detection unit 31, the immersion-operation-unit model image of the controller CT11 can be superimposed on the position corresponding to the position of the actual controller CT11 on the spherical image. That is to say, the renderer unit 35 is capable of displaying the immersion-operation-unit model image at the position defined by the position-and-orientation information regarding the controller CT11 on the spherical image.

For example, for use of the controller CT11 as the immersion operation unit 14, a linear pointer is displayed from the model of the controller CT11 represented by the immersion-operation-unit model image, on the spherical image for presentation.

This pointer moves along with the model of the controller CT11 on the spherical image for presentation when the user moves the actual controller CT11. Thus, the movement of the controller CT11 by the user allows the pointer to indicate any position on the spherical image for presentation. Therefore, for example, the user designates, with the pointer, a desired position on the spherical image, and operates a button of the actual controller CT11 with the desired position designated or the like, whereby the user can perform an operation input such as an effect application to a region designated in the spherical image.

Besides, for example, the user can designate, with the pointer, a button of a UI such as a menu image on the spherical image to instruct performance or the like, whereby the user can also perform an operation regarding reproduction or editing of the spherical image.

Note that if the operation detection unit 32 refers to the position-and-orientation information regarding the actual controller CT11, a position where the pointer and the spherical image for presentation intersects, that is, a position on the spherical image for presentation designated by the pointer can be specified.

Furthermore, as indicated by the arrow A12 in FIG. 2, even in a case where the input device PN11 is used as the immersion operation unit 14, the position and orientation of the input device PN11 are tracked similarly in the case of the controller CT11.

Then, on the spherical image for presentation, a model of the input device PN11 is displayed as the immersion-operation-unit model image at a position identical to the position of the actual input device PN11 and at an orientation identical to the orientation of the input device PN11.

In this case, the user can not only perform a desired operation input by operating a pen tablet as the input device 13, with the input device PN11, but also can move the input device PN11 to designate, with the model of the input device PN11, any position on the spherical image for presentation.

Thus, for example, the user can designate, with the model of the input device PN11, a button of a UI such as a menu image on the spherical image for presentation, or the like, whereby the user can also perform an operation regarding reproduction or editing of the spherical image. Similarly, the user can designate any position on the spherical image, with the model of the input device PN11, whereby the user can also perform an operation input such as an effect application to a region including the position.

Similarly in the case of the controller CT11, the operation detection unit 32 refers to position-and-orientation information regarding the input device PN11, whereby allowing specification of the position in the space designated by the input device PN11, that is, the position on the spherical image for presentation.

Furthermore, even in a case where a user's own hand is used as the immersion operation unit 14, an immersion-operation-unit model image is displayed similarly to the input device PN11, whereby allowing designation of any position on the spherical image for presentation.

Besides, the position and orientation of a mouse, a keyboard, or the like as an example of the immersion operation unit 14 may be tracked, and a model of the mouse or keyboard may be displayed as an immersion-operation-unit model image on the spherical image for presentation. Even in this case, the model of the mouse or keyboard is displayed at a position and at an orientation identical to the position and orientation of the mouse or keyboard as the actual immersion operation unit 14.

An immersion-operation-unit model image such as described above is self-projection graphics in which an actual immersion operation unit 14 is projected at a position and at an orientation identical to the position and orientation on a spherical image for presentation.

Next, the see-through window as one of the UI images generated by the editing reflection processing unit 34 will be described.

For example, with the immersive presentation device 11 worn on the user's head, basically, the user cannot visually verify the input device 13 such as a mouse, a keyboard, or a pen tablet located at hand of the user himself/herself. The input device 13 invisible to the user as described above causes inconvenience for the user because the user has to find or operate the input device 13 by groping in, for example, editing of a spherical image.

Thus, for the editing system, the see-through window is superimposed on the spherical image and displayed thereon such that the user can verify a region at hand of the user himself/herself including the input device 13, even with the immersive presentation device 11 worn by the user.

For example, the see-through window is an image generated by the editing reflection processing unit 34 that cuts out a specific region of a captured image obtained by the image capturing unit 21. The region cut out as the see-through window on the captured image is a region near the user defined previously, and is regarded as, for example, a region of a portion of a hand of the user with the user substantially facing front. Thus, it can be said that the see-through window is an image including the input device 13 is at hand of the user, as a subject. Note that a captured image as it is may be regarded as a see-through window.

Figure 3:
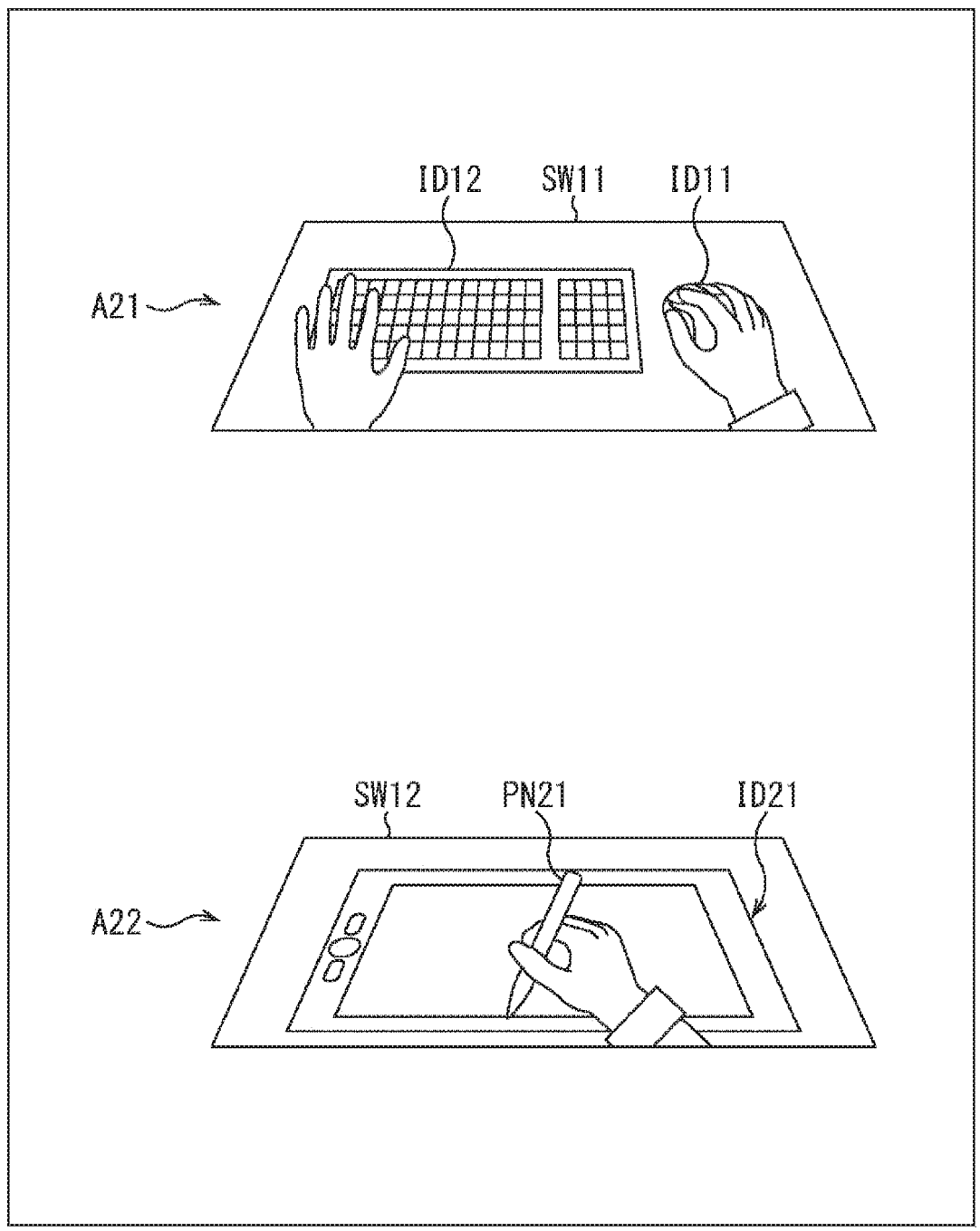
FIG. 3 is an explanatory illustration of a see-through window.

As a specific example, a see-through window illustrated in FIG. 3 is displayed, for example, on the spherical image for presentation.

In other words, in the example indicated by an arrow A21 in FIG. 3, a mouse ID11 and a keyboard ID12 as the input devices 13 and both hands of the user with which the input device 13 operates that exist in the real space are displayed in a see-through window SW11.

Here, subjects in the see-through window SW11 are displayed at positions identical to the positions where the subjects are in the real space as viewed from the user, respectively.

For example, with the immersive presentation device 11 worn by the user, a position where the mouse ID11 is displayed on the see-through window SW11 as viewed from the user is referred to as a model presentation position. If the user removes the immersive presentation device 11 from such a state, the actual mouse ID11 is visible to the user at the model presentation position.

As described above, in the see-through window SW11, an object visible at the position completely identical to the actual position by part of the visual field of the image capturing unit 21, in particular, an object located at hand of the user is displayed.

Thus, the user can perform an operation while verifying a hand of the user, or the mouse ID11, the keyboard ID12, and the like located at hand of the user, with the immersive presentation device 11 worn. As a result, the usability of the editing system can be improved. In other words, work such as editing can be performed more easily.

Note that if the renderer unit 35 refers to position-and-orientation information regarding the immersive presentation device 11 supplied from the communication unit 36, the see-through window SW11 can be superimposed and displayed at a position corresponding to the visual field of the actual image capturing unit 21 on the spherical image. In other words, the renderer unit 35 superimposes an image of the see-through window SW11 at the position on the spherical image defined by the position and orientation of the immersive presentation device 11.

Thus, for example, if the user moves the head, the position of the see-through window SW11 on the spherical image for presentation also moves with the movement of the head, and the user can always verify a region at hand of the user himself/herself with the see-through window SW11.

In particular, suitable adjustment of the orientation of the user's own head by the user enables display of a subject that the user desires to view, such as the mouse ID11 or the keyboard ID12, on the see-through window SW11.

Furthermore, for example, in the example indicated by an arrow A22 in FIG. 3, a pen tablet ID21 as the input device 13, a user's own hand, and a pen-type input device PN21 as the immersion operation unit 14 held by the hand that exist in the real space are displayed in the see-through window SW12. Thus, the user can perform an input operation to the pen tablet ID21 with the input device PN21, while viewing the see-through window SW12.

A see-through window such as described above is self-projection graphics in which a partial region of the user's visual field that would have been visible if the user did not wear the immersive presentation device 11 is projected at a position identical to the position on the spherical image for presentation.

The display of the see-through window on the spherical image for presentation allows the user to facilitate performing work such as editing while operating the input device 13, even with the immersive presentation device 11 worn.

Subsequently, the menu image as one of the UI images generated by the editing reflection processing unit 34 will be described.

For example, for use of a user's own hand as the immersion operation unit 14 by the user enables designation of any position (region) on the spherical image for presentation, while moving the user's own hand.

Figure 4:
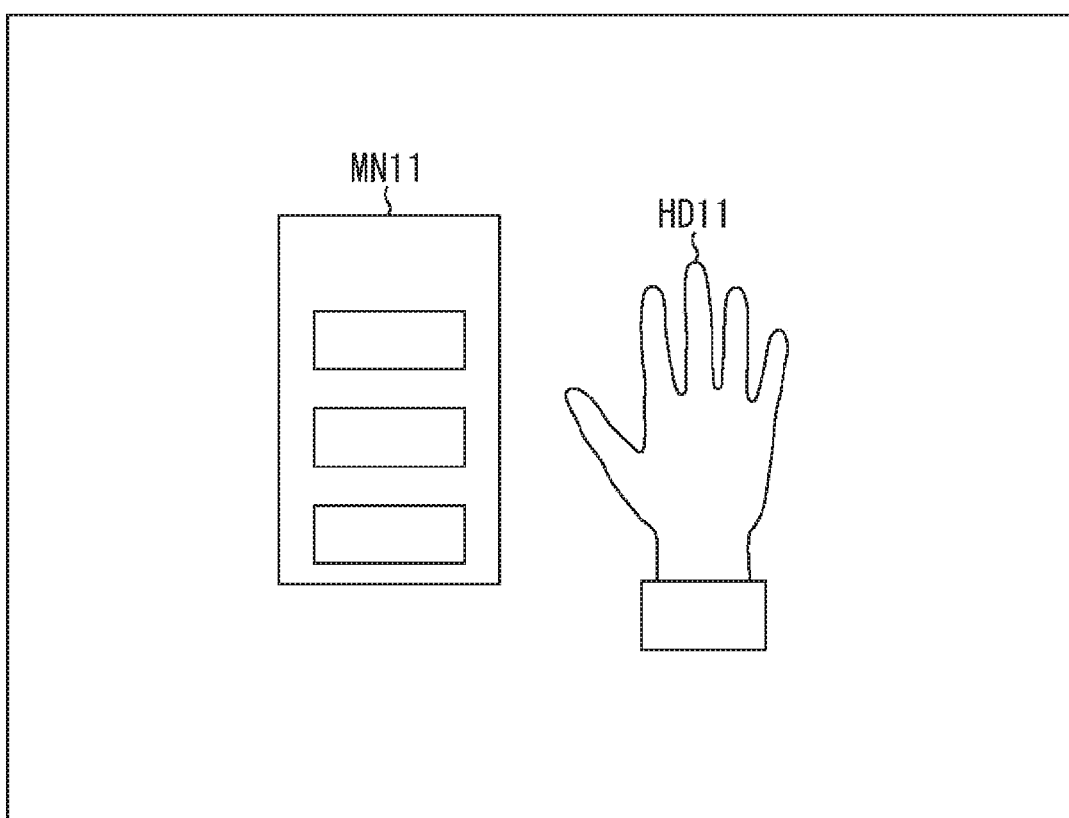
FIG. 4 is an explanatory illustration of a menu image.

In this case, for example, as illustrated in FIG. 4, if a menu image MN11 such as a reproduction controller linked to the user's hand is displayed near a hand model HD11 of the user displayed as an immersion-operation-unit model image at the spherical image for presentation, operability can be improved.

In this example, for example, on the menu image MN11, there is provided a button for an instruction on an operation regarding reproduction or editing of the spherical image, such as reproduction or reproduction stop of the spherical image as content.

Furthermore, the menu image MN11 is displayed at a position defined previously with respect to the hand model HD11. When the user moves the user's own hand, the menu image MN11 also moves with the movement of the hand. In other words, the relative positional relationship between the hand model HD11 and the menu image MN11 is always identical. The user moves a hand opposite to the hand corresponding to the hand model HD11 and operates a button on the menu image MN11, whereby the user can perform an operation regarding reproduction or editing of the spherical image.

If the renderer unit 35 refers to position-and-orientation information regarding the user's hand as the immersion operation unit 14 supplied from the position-and-orientation detection unit 31, the menu image MN11 can be superimposed and displayed at a position near the position corresponding to the actual user's hand on the spherical image.

A hand model of the user and a menu image displayed near the hand model such as described above are self-projection graphics in which an actual immersion operation unit 14 and a virtual menu image are projected on the spherical image for presentation. The display of the menu image on the spherical image for presentation allows the user to facilitate performing work such as editing with operation of the menu image, even with the immersive presentation device 11 worn.

Moreover, the auxiliary window as one of the UI images generated by the editing reflection processing unit 34 will be described.

The auxiliary window is an auxiliary screen displayed on a spherical image for presentation and for reproducing and editing a spherical image with the immersive presentation device 11 worn by the user.

Figure 5:
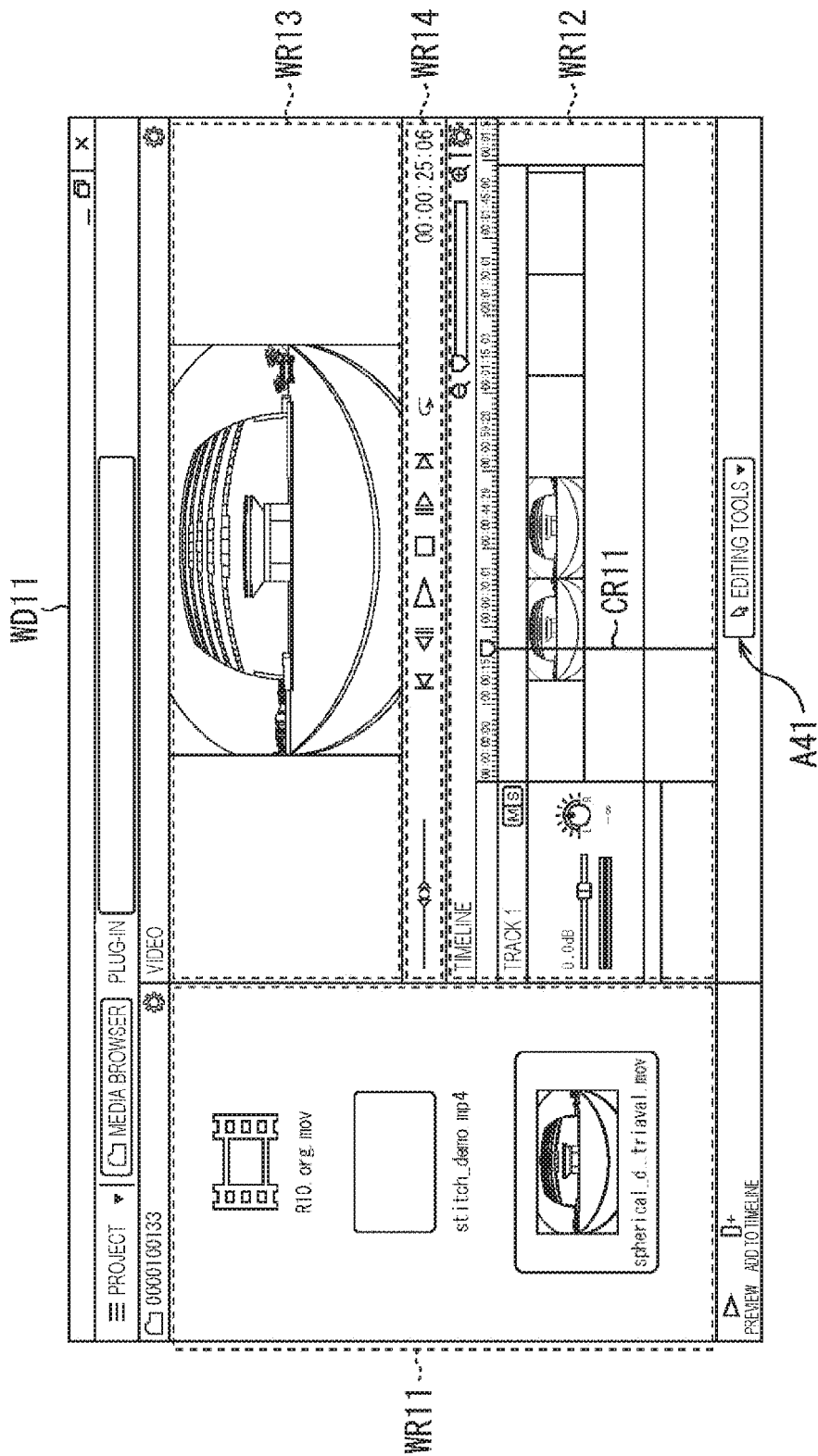
FIG. 5 is an illustration of an exemplary auxiliary window.

FIG. 5 is an illustration of an exemplary auxiliary window as one of the UI images.

In this example, a media bin region WR11, a timeline region WR12, an image display region WR13, and a reproduction-related-button display region WR14 are provided in the auxiliary window WD11.

For example, the media bin region WR11 is a region in which thumbnail images of spherical images imported by the editing reflection processing unit 34 and to be edited, that is, thumbnail images of material clips are placed and displayed.

The user designates a thumbnail image displayed in the media bin region WR11, whereby a material clip corresponding to the designated thumbnail image can be disposed alongside on the timeline in the timeline region WR12.

In the timeline region WR12, the timeline on which thumbnail images of the clip material designated on the media bin region WR11 are placed in time series is displayed. A scale for times is also displayed on the timeline, and the thumbnail images of the clip material respectively corresponding to the times are displayed on part of the times indicated by the scale.

Furthermore, in the timeline region WR12, a cursor CR11 superimposed on the timeline and indicating a time to be processed is also displayed. In a material clip (spherical image images) during editing, an image (frame) of a time indicated by the cursor CR11 is displayed in the image display region WR13.

Note that, in the image display region WR13, an equirectangular two-dimensional image is displayed as the material clip (spherical image). The material clip during editing is not only displayed in the image display region WR13 in the auxiliary window WD11 on the spherical image for presentation, but also is displayed as a spherical image included in the spherical image for presentation. In this case, the material clip displayed as the spherical image included in the spherical image for presentation is an image obtained by mapping an equirectangular image in a 3D model.

In the reproduction-related-button display region WR14, buttons (hereinafter, also referred to as reproduction-related buttons) for an instruction on reproduction, reproduction stop, fast forward, fast reverse, and the like of the material clip during editing are displayed. Operation of a reproduction-rerated-button enables the user to reproduce and verify the material clip during editing, or enables the user to stop the reproduction at a desired position (time).

Moreover, when the button at a part indicated by an arrow A41 is operated, a toolbox for designating an editing tool, in a predetermined style such as a pull-down style, is displayed.

The user displays the toolbox and designates a desired editing tool, or the like, whereby the user can perform various types of editing work, for example, designation of an in point or an out point, addition of an effect, designation of the front point of a spherical image, and insertion of text data such as a title.

Specifically, for example, accompanying information is added to a spherical image as a material clip, and the front point of the spherical image can be set with the accompanying information.

Here, the frontal point means a position on a spherical image in the front direction as viewed from the user with the immersive presentation device 11 worn, when display of the spherical image (material clip) is started by the immersive presentation device 11.

For example, accompanying information is added to each material clip in advance, and the front point indicated by the accompanying information before editing of the material clip is a front point at image capturing. At editing of the material clip, the user edits the accompanying information regarding the material clip with use of, for example, an editing tool, thereby enabling the front point indicated by the accompanying information to be changed to a desired position.

For example, the designation of the position to be the front point at editing of the accompanying information may be performed by designating a position on the material clip (spherical image) displayed in the image display region WR13 in the auxiliary window WD11, or may be performed by directly designating a position on the spherical image for presentation displayed on the immersive presentation device 11.

Note that, here the example in which the front point is editable is described as an example of accompanying information regarding the material clip. However, in addition to the example, any other information may be edited as accompanying information.

Furthermore, the in point and the out point of the material clip can be designated in the auxiliary window WD11. For example, it is assumed that the user designates a time to be the in point and a time to be the out point of each material clip placed on the timeline with an editing tool.

In this case, the editing reflection processing unit 34 cuts out a segment from the in point to the out point of each material clip for the material clips on the timeline, and the cut-out segments of those material clips are stitched together to form one entire spherical image. At this time, a transition effect, for example, with dissolution processing is applied to part of a seam, that is, at a boundary position between material clips, so that a video image can be seamlessly transferred from a material clip to the next material clip.

Moreover, in the auxiliary window WD11, for example, the user can also designate a desired region of a material clip (spherical image) to perform effect processing on the designated region, or to insert a title or the like into the designated region, with an editing tool. Examples of the effect processing that can be performed include white balance adjustment and brightness adjustment, noise reduction processing, and soft filtering processing.

Note that the designation of a region to which an effect is to be applied and a title insertion position may be performed by designating a region on the material clip (spherical image) displayed in the image display region WR13 in the auxiliary window WD11, or may be performed by directly designating a region on the spherical image for presentation displayed on the immersive presentation device 11.

For the editing system, an auxiliary window WD11 such as described above is displayed on the display 12 as well as on the spherical image for presentation. Note that here the example in which the auxiliary window WD11 is displayed is described; however, only part of the auxiliary window WD11 may be displayed, for example, only the timeline is displayed on the spherical image for presentation and the display 12.

Alternatively, the auxiliary window WD11 may be always displayed at an identical position and at an identical orientation as viewed from the user with the immersive presentation device 11 worn, or may be always displayed at an identical position and at an identical orientation in a spherical image for presentation.

For example, it is assumed that the auxiliary window WD11 is always displayed at an identical position and at an identical orientation as viewed from the user with the immersive presentation device 11 worn. That is to say, it is assumed that the position and orientation of the auxiliary window WD11 are fixed with respect to the immersive presentation device 11.

In such a case, even if the user with the immersive presentation device 11 worn moves the head, the auxiliary window WD11 is always displayed at the identical position and at the identical orientation as viewed from the user, on the spherical image for presentation. In other words, even if the user moves the head, the relative positional relationship between the user and the auxiliary window WD11 is unchanged.

In this example, if the renderer unit 35 refers to the position-and-orientation information regarding the immersive presentation device 11 supplied from the communication unit 36, the auxiliary window WD11 can be superimposed and displayed at a position defined previously and at an orientation defined previously as viewed from the user on the spherical image. That is to say, the renderer unit 35 superimposes an image of the auxiliary window WD11 at the position on the spherical image defined by the position and orientation of the immersive presentation device 11.

On the other hand, in a case where the auxiliary window WD11 is always displayed at an identical position and at an identical orientation on the spherical image for presentation, the renderer unit 35 superimposes and displays the auxiliary window WD11 at a position defined previously and at an orientation defined previously on the spherical image, without depending on the orientation of the user's head. That is to say, the auxiliary window WD11 is fixed and displayed at a position defined previously in the world coordinate system in which origin is a position defined previously in the real space.

Thus, in this case, when the user with the immersive presentation device 11 worn moves the head, the display position of the auxiliary window WD11 as viewed from the user changes in accordance with the movement of the head. That is, the relative positional relationship between the user and the auxiliary window WD11 changes in accordance with the movement of the user's head.

Note that the user can operate the immersion operation unit 14 to move the position of the auxiliary window WD11 on the spherical image for presentation, or to change the size of the auxiliary window WD11, for example.

Specifically, for example, it is assumed that the user operates the controller CT11 illustrated in FIG. 2 as the immersion operation unit 14.

In this case, for example, it is assumed that the user moves the controller CT11 to move the model of the controller CT11 on the spherical image for presentation and designates the auxiliary window WD11 by the pointer extending from the model.

As an example, the state where the auxiliary window WD11 is designated by the pointer is, for example, a state where the pointer is located at a position at which the pointer intersects the auxiliary window WD11 and a predetermined button of the controller CT11 is pressed, or the like.

The user further moves the controller CT11 with the auxiliary window WD11 designated by the pointer and performs drag operation or the like, to move the display position of the auxiliary window WD11, and to enlarge or reduce the auxiliary window WD11.

In other words, for example, the user moves the controller CT11 with the auxiliary window WD11 designated by the pointer, to move the auxiliary window WD11. At this time, the position of the movement destination of the pointer is regarded as the position of the movement destination of the auxiliary window WD11.

Furthermore, for example, from the state where the auxiliary window WD11 designated by each of two controllers CT11, the user moves the two controllers CT11 close to or away from mutually, to enlarge or reduce the auxiliary window WD11.

Moreover, for example, it is assumed that the auxiliary window WD11 in a curved state is displayed such that the auxiliary window WD11 has a concave curved shape as viewed from the user, on a spherical image for presentation. In this case, the user may operate the immersion operation unit 14 or the like to adjust the degree of curving of the auxiliary window WD11, that is, the degree of curvature of the concave curved shape.

<Example of Editing Work>

Subsequently, an example of editing work on a spherical image performed by the user, that is, an example of a specific usage scene of the editing system will be described.

Here, as an example, a case will be described where a plurality of material clips is stitched together to produce a documentary video image of about five minutes.

First, the user operates the immersion operation unit 14 and the input device 13 to designate, for example, about 10 material clips (spherical images) in order, and issues an instruction on reproducing those material clips to preview each of the material clips.

In this case, the operation detection unit 32 generates operation-detection information for instruction on reproducing the designated material clips in accordance with signals supplied from the immersion operation unit 14 and the input device 13 and position-and-orientation information supplied from the position-and-orientation detection unit 31, and supplies the operation-detection information to the editing reflection processing unit 34.

The editing reflection processing unit 34 supplies the designated material clips to the renderer unit 35, in accordance with the operation-detection information from the operation detection unit 32. Furthermore, the renderer unit 35 supplies a spherical image for presentation including the material clips as spherical images supplied from the editing reflection processing unit 34, to the immersive presentation device 11 through the communication unit 36 for reproducing the material clips.

After the material clips are reproduced and the preview of the material clip ends, the user operates the immersion operation unit 14 and the input device 13 to designate desired material clips, and issues an instruction on import of the designated material clips.

After that, the operation detection unit 32 generates operation-detection information regarding the import of the material clips in response to the user's operation, and supplies the operation-detection information to the editing reflection processing unit 34.

The editing reflection processing unit 34 imports the designated material clips, in accordance with the operation-detection information from the operation detection unit 32. In the import of the material clips, the editing reflection processing unit 34 converts, as necessary, the material clips from equirectangular image data to image data in a format obtained by mapping the image data in a 3D model. Thereafter, the editing reflection processing unit 34 supplies the converted image data to the retaining unit 33 for retaining the converted image data.

After the material clips are imported as described above, thumbnail images of the material clips are placed and displayed in the media bin region WR11, in the auxiliary windows WD11 each displayed on the immersive presentation device 11 and the display 12.

The user operates the immersion operation unit 14 and the input device 13 to, for example, designate the thumbnail images in the media bin region WR11, and places each of the material clips on the timeline in the timeline region WR12.

The editing reflection processing unit 34 generates an image of the auxiliary window WD11 with the thumbnail images of the designated material clips displayed on the timeline, that is, an image of the auxiliary window WD11 with the user's operation reflected, in accordance with the operation-detection information supplied from the operation detection unit 32, and then supplies the generated image to the renderer unit 35 and the display 12.

The renderer unit 35 superimposes the image of the auxiliary window WD11 supplied from the editing reflection processing unit 34, on the spherical image to generate the spherical image for presentation, and supplies the spherical image for presentation to the immersive presentation device 11 through the communication unit 36 for displaying the spherical image for presentation.

For example, when thumbnail images of designated material clips are placed on the timeline, a frame at a time indicated by the cursor CR11 on a material clip is displayed as a frame during editing, on the immersive presentation device 11. That is, a frame of a material clip during editing as a spherical image with the auxiliary window WD11 and a different UI image superimposed on the frame is displayed as the spherical image for presentation, on the immersive presentation device 11.

The user operates the immersion operation unit 14 and the input device 13 to designate an in point and an out point for each material clip arranged in the timeline, and then issues an instruction on adding narration to the spherical image. After that, the operation detection unit 32 detects the user's operation on the basis of signals from the immersion operation unit 14 and the input device 13 and position-and-orientation information supplied from the position-and-orientation detection unit 31, and supplies operation-detection information indicating the result of the detection to the editing reflection processing unit 34.

The editing reflection processing unit 34 cuts out segments from the in point to the out point of each material clip and stitches together, in accordance with the operation-detection information supplied from the operation detection unit 32, and a part where the material clips are stitched together, that is, a boundary part is subjected to processing such as dissolution. Furthermore, the editing reflection processing unit 34 adds voice data of the designated narration, to one spherical image including the stitched material clips.

Moreover, the user operates the immersion operation unit 14 and the input device 13 to designate a front point for each material clip and insert a title at a desired position of the material clip. In insertion of a title, if the user operates the immersion operation unit 14 or the like to designate, as the title insertion position of the title, a position on the spherical image for presentation displayed on the immersive presentation device 11, the user can intuitively designate the size and insertion position of the title to be inserted.

When such an operation is performed, the operation detection unit 32 detects the user's operation on the basis of the signals from the immersion operation unit 14 and the input device 13 and the position-and-orientation information supplied from the position-and-orientation detection unit 31, and supplies operation-detection information indicating the result of the detection to the editing reflection processing unit 34.

The editing reflection processing unit 34 edits accompanying information regarding the material clip and inserts the title into the material clip such that the front point of the material clip is located at the position designated by the user, in accordance with the operation-detection information supplied from the operation detection unit 32.

The editing reflection processing unit 34 reflects, in real time, the editing operation by the user on the material clip (spherical image) during editing, and the material clip with the editing operation reflected is supplied from the editing reflection processing unit 34 to the renderer unit 35.

Then, the renderer unit 35 performs rendering processing on the material clip (spherical image) after the reflection of the editing operation, and a spherical image for presentation is generated, and displayed by the immersive presentation device 11. Thus, the user can immediately verify the material clip with the editing operation by the user himself/herself reflected, while wearing the immersive presentation device 11.

After the user's editing work is completed and the spherical image as final one content is obtained, the user operates the immersion operation unit 14 and the input device 13 to issue an instruction on reproducing the spherical image obtained by the editing, and previews the spherical image.

In this case, the operation detection unit 32 generates operation-detection information for an instruction on reproduction of the spherical image, in accordance with signals supplied from the immersion operation unit 14 and the input device 13 and position-and-orientation information supplied from the position-and-orientation detection unit 31, and supplies the operation-detection information to the editing reflection processing unit 34.

The editing reflection processing unit 34 supplies the spherical image obtained by the editing, to the renderer unit 35, in accordance with the operation-detection information from the operation detection unit 32. Furthermore, the renderer unit 35 performs rendering processing on the basis of the spherical image supplied from the editing reflection processing unit 34, and supplies the spherical image for presentation to the immersive presentation device 11 through the communication unit 36 for reproducing the spherical image for presentation.

After the user reproduces and verifies the spherical image obtained by the editing, with the immersive presentation device 11, the user operates the immersion operation unit 14 and the input device 13 to issue an instruction on storage of the spherical image. After that, in response to the user's operation, the renderer unit 35 converts the spherical image obtained by the editing into image data in a suitable format such as equirectangular image data (e.g., mp4 file), and outputs and records the obtained spherical image.

As described above, the editing system allows the user to facilitate all the pieces of work from preview of a material clip, editing, to preview of a completed spherical image, while wearing the immersive presentation device 11.

In particular, for editing work such as front point designation or title insertion, the user can perform such work while verifying each part of a spherical image, with the spherical image displayed on the immersive presentation device 11, that is, with the spherical image in the actual reproduction displayed. Thus, editing work can be performed more easily as intended by the user himself/herself.

<Description of Content Editing Processing>

Next, the flow of processing performed in the editing system will be described.

Figure 6:
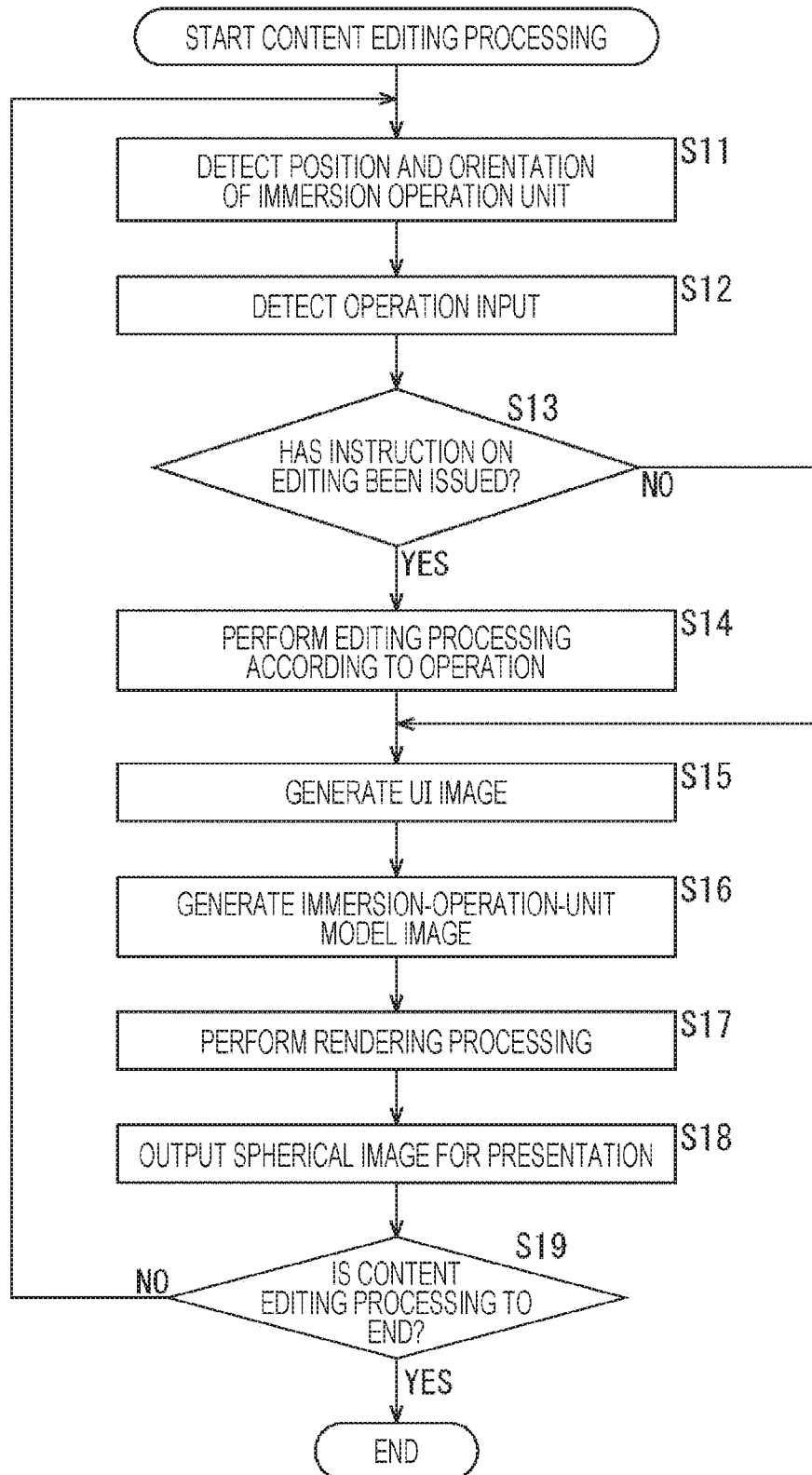
FIG. 6 is a flowchart for describing content editing processing.

In other words, content editing processing performed by the editing system will be described below with reference to the flowchart of FIG. 6.

In step S11, the position-and-orientation detection unit 31 detects the position and orientation of the immersion operation unit 14, and supplies position-and-orientation information indicating the result of the detection to the operation detection unit 32, the editing reflection processing unit 34, and the renderer unit 35.

Furthermore, the communication unit 36 acquires position-and-orientation information and a captured image of the immersive presentation device 11 from the immersive presentation device 11, supplies the position-and-orientation information to the renderer unit 35, and supplies the captured image to the editing reflection processing unit 34.

In step S12, the operation detection unit 32 detects an operation input by the user, on the basis of the position-and-orientation information supplied from the position-and-orientation detection unit 31, a signal supplied from the input device 13, and a signal supplied from the immersion operation unit 14, and supplies operation-detection information indicating the result of the detection to the editing reflection processing unit 34.

For example, in a case where an operation of a specific button on the auxiliary window by the user is detected on the basis of the position-and-orientation information regarding the immersion operation unit 14 and the signal supplied from the immersion operation unit 14, the operation detection unit 32 generates operation-detection information indicating the result of the detection to supply the operation-detection information to the editing reflection processing unit 34.

In step S13, the editing reflection processing unit 34 determines, on the basis of the operation-detection information supplied from the operation detection unit 32, whether or not the user has issued an instruction on editing.

For example, in step S13, in a case where the operation-detection information indicates an operation regarding editing such as insertion of a title, designation of a front point, addition of an effect, or designation of an in point and an out point, it is determined that an instruction on editing has been issued.

In a case where it is determined in step S13 that an instruction on editing has been issued, in step S14, the editing reflection processing unit 34 performs editing processing according to the operation input regarding editing indicated by the operation-detection information supplied from the operation detection unit 32.

For example, the editing reflection processing unit 34, for example, reads a spherical image retained in the retaining unit 33 to insert a title to the spherical image, edits accompanying information regarding the spherical image, and applies an effect to the spherical image, as editing processing.

After the editing processing is performed, the editing reflection processing unit 34 supplies the spherical image obtained by the editing processing to the renderer unit 35, and the content editing processing proceeds to step S15.

On the other hand, in a case where it is determined in step S13 that no instruction on editing has been issued, the processing in step S14 is not performed, and the content editing processing proceeds to step S15.

After it is determined that the processing in step S14 has been performed or no editing instruction has been issued in step S13, the editing reflection processing unit 34 generates a UI image in step S15.

In step S15, for example, the see-through window image, the auxiliary window image, or the menu image described above are generated as a UI image.

In other words, for example, the editing reflection processing unit 34 cuts out part of the captured image supplied from the communication unit 36 to generate the see-through window image, or generates, on the basis of the operation-detection information, the auxiliary window image with the user's operation reflected.

In step S16, the editing reflection processing unit 34 generates an immersion-operation-unit model image on the basis of the position-and-orientation information supplied from the position-and-orientation detection unit 31.

The editing reflection processing unit 34 supplies, to the renderer unit 35, the UI image and the immersion-operation-unit model image generated in the processing in step S15 and step S16, respectively. Furthermore, the auxiliary window as the UI image generated in step S15 is also supplied from the editing reflection processing unit 34 to the display 12, and the auxiliary window is displayed on the display 12.

In step S17, the renderer unit 35 performs rendering processing on the basis of the position-and-orientation information of the immersive presentation device 11 supplied from the communication unit 36 and the position-and-orientation information of the immersion operation unit 14 supplied from the position-and-orientation detection unit 31.

In other words, the renderer unit 35 superimposes, on the basis of the position-and-orientation information of the immersive presentation device 11 and the position-and-orientation information of the immersion operation unit 14, the immersion-operation-unit model image and the UI image on a suitable position of the spherical image supplied from the editing reflection processing unit 34, and generates a spherical image for presentation. Furthermore, the renderer unit 35 appropriately converts the spherical image for presentation into image data in a format that can be handled by the immersive presentation device 11, and supplies the image data to the communication unit 36.

In step S18, the communication unit 36 outputs the spherical image for presentation supplied from the renderer unit 35, to the immersive presentation device 11. Furthermore, the immersive presentation device 11 displays the spherical image for presentation supplied from the communication unit 36.

That is to say, the renderer unit 35 supplies the spherical image for presentation to the immersive presentation device 11 through the communication unit 36 for displaying the spherical image for presentation. In particular, in a case where editing processing according to the operation input regarding editing is performed in step S14, the renderer unit 35 controls display at the immersive presentation device 11 such that the spherical image for presentation with the operation input regarding editing reflected in real time is displayed.

After the spherical image for presentation is displayed by the immersive presentation device 11, the user wearing the immersive presentation device 11 can operate the immersion operation unit 14 and the input device 13 to perform editing work, while verifying the spherical image during editing, with the immersive presentation device 11.

Note that, in step S18, the communication unit 36 may also output the spherical image for presentation to an immersive presentation device different from the immersive presentation device 11. In other words, the identical spherical image for presentation may be simultaneously output to the immersive presentation device 11 and the different immersive presentation device. With this arrangement, the identical spherical image for presentation can be simultaneously viewed at the plurality of immersive presentation devices including the immersive presentation device 11.

In step S19, the image processing apparatus 15 determines whether or not the content editing processing is to end. For example, in step S19, in a case where the user has issued an instruction on end of editing, it is determined that the content editing processing is to end.

In a case where it is determined in step S19 that the content editing processing is not to end yet, the content editing processing returns back to step S11, and the above-described processing is repeated.

On the other hand, in a case where it is determined in step S19 that the content editing processing is to end, the content editing processing ends. In this case, the spherical image obtained by the editing is appropriately stored and output to an external apparatus.

As described above, the editing system superimposes the UI image and the immersion-operation-unit model image on the spherical image in response to the user's operation, and generates the spherical image for presentation to display the spherical image for presentation by the immersive presentation device 11. This arrangement allows the user to more facilitate editing work while verifying the spherical image, with the immersive presentation device 11 worn.

Specific Editing Example

As described above, according to the present embodiment, editing work can be performed more easily while verifying the spherical image. Here, an example of the editing will be described.

Figure 7:
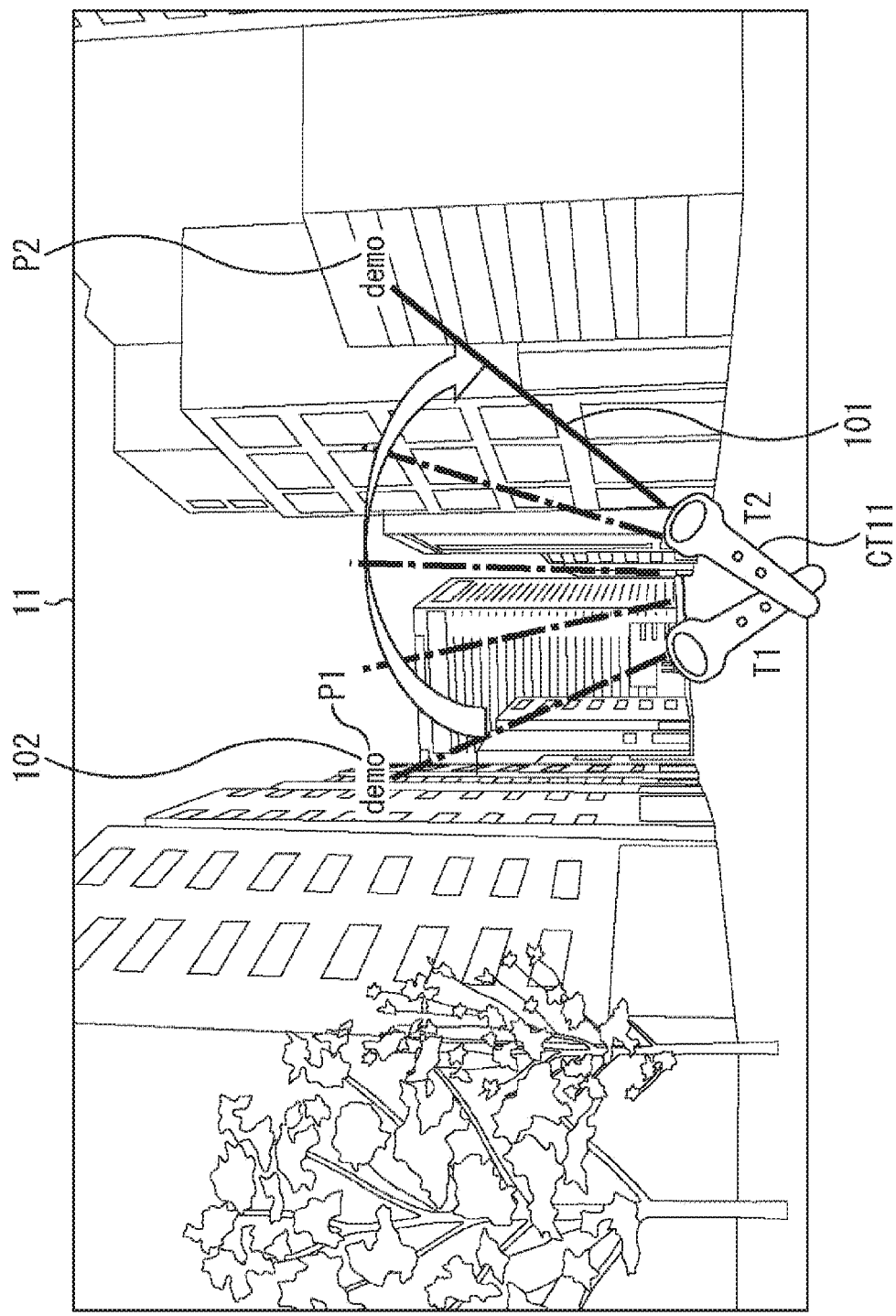
FIG. 7 is an explanatory illustration of an editing example.

FIG. 7 illustrates an exemplary screen displayed on the immersive presentation device 11. A spherical image for presentation is displayed on the entire screen of the immersive presentation device 11.

On the lower center side of the screen, the controller CT11 is displayed as an immersion-operation-unit model image. Hereinafter, the immersion-operation-unit model image of the controller CT11 displayed on the screen will be represented as an immersion-operation-unit model image CT11.

A pointer 101 is projected from the leading end of the immersion-operation-unit model image CT11. The pointer 101 is an illustration like a copy of a laser pointer, and is displayed by a straight line of a predetermined color. In the example illustrated in FIG. 7, the termination of the pointer 101 points to text 102 such as "demo".

This text 102 is text superimposed (overlaid) on the spherical image for presentation. Here, the description is cited such text as an example; however, a mark or the like may be used. The text 102 is an exemplary image superimposed on the spherical image for presentation.

It is assumed that at a time T1, the text 102 is displayed at a position P1 on the left side in the drawing. Furthermore, at the time T1, the leading end of the immersion-operation-unit model image CT11 is directed to the position P1, and the pointer 101 from the immersion-operation-unit model image CT11 points to the text 102.

At the time T1, the user operates a button (e.g., a button 122 illustrated in FIG. 9) of the controller CT11 to move the controller CT11 rightward. With this operation, the text 102 is grabbed (dragged) and moves to a position P2.

That is, in a case where an operation such as movement of the leading end portion from left to right with the button of the controller CT11 still pressed down during the time T1 to a time T2, that is to say, an operation such as movement of the termination of the pointer 101 from the position P1 to the position P2 with the button still operated, the text 102 moves from the position P1 to the position P2.

In other words, performance of a so-called drag and drop operation with the controller CT11 allows the user to move the text 102 to a desired position in the spherical image for presentation.

The user can perform such an operation with the immersive presentation device 11 worn, and can also perform such an operation while viewing the spherical image for presentation presented on the immersive presentation device 11. Thus, an operation such as movement of the text 102 from a less-visible position due to the background to a visible position, for example can be performed easily.

As another operation example, the user can also perform an operation of changing the text 102 to a desired size while viewing the spherical image for presentation.

Figure 8:
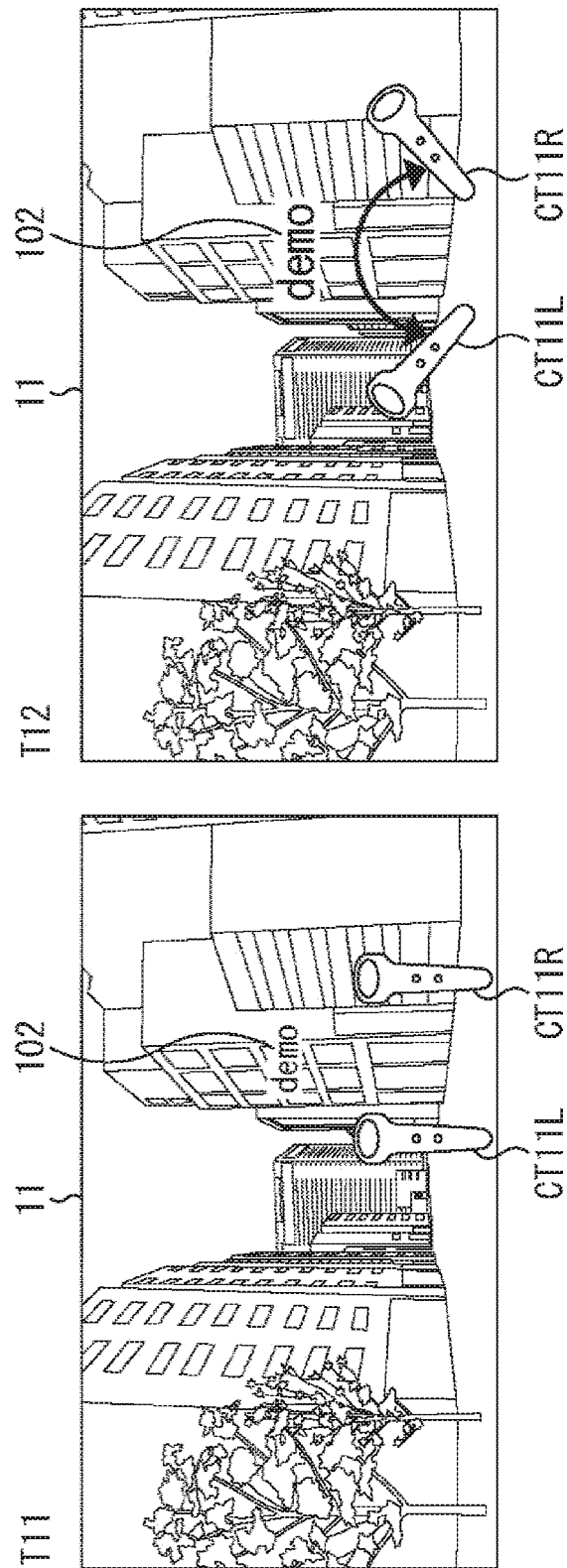
FIG. 8 is an explanatory illustration of an editing example.

For example, as illustrated in FIG. 8, at a time T11, the text 102 is displayed in a predetermined size, and if the user desires to enlarge the text 102, the user performs an operation such as mutual separation of the controllers CT11 and the text 102 can be enlarged.

At the time T11, an immersion-operation-unit model image CT11L representing a controller CT11 held by the user's left hand (referred to as a controller CT11L) and an immersion-operation-unit model image CT11R representing another controller CT11 held by the user's right hand (referred to as a controller CT11R) are superimposed on the spherical image for presentation and displayed thereon.

In a case where the user desires to enlarge the text 102, the user operates a predetermined button of the controller CT11L or the controller CT11R to select the text 102, and then performs an operation such as mutual separation of the controller CT11L and the controller CT11L left and right.

As illustrated as a time T12, the performance of the operation such as the mutual separation of the controller CT11L and the controller CT11L left and right results in enlargement of the text 102. Note that although not illustrated, in a case where performance of an operation such as mutual movement of the controller CT11L and the controller CT11L close left and right, the text 102 is reduced.

As described above, the change in size such as enlargement or reduction of the text 102 can be performed with a simple operation such as the mutual separation or the mutual movement of the two controllers CT11 close left and right.

Furthermore, such change in size of the text 102 can also be performed in the spherical image for presentation, whereby a desired size can be made while verifying the size on the spherical image actually presented.

<Configuration of Controller>

There will be added a description regarding the controller CT11 with which such operations are performed.

Figure 9:
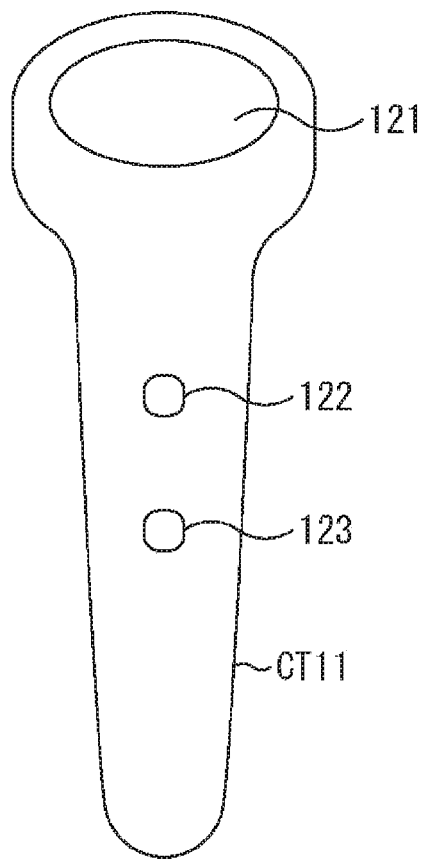
FIG. 9 is an explanatory illustration of the configuration of a controller.

The controller CT11 includes a touch pad 121, the button 122, and a button 123, as illustrated in FIG. 9. The touch pad 121 is a flat-panel sensor, and allows performance of an operation similar to the operation with a mouse pointer by tracing or tapping with a finger on the sensor.

The button 122 and the button 123 each have predetermined processing allocated thereto, and when pressed down, an instruction for the allocated operation can be issued. For example, as described above, the button 122 is operated when the text 102 superimposed on the spherical image is selected (dragged).

Note that the configuration and shape of the controller CT11 illustrated in FIG. 9 each are an example and do not indicate limitation. For example, the controller CT11 illustrated in FIG. 9 is provided with the two buttons 122 and 123; however, a plurality of buttons may be further provided, or may be provided at a portion such as a side face or the back face of the controller CT11 different from the portions illustrated in FIG. 9.

As described with reference to FIGS. 7 and 8, the user operates the controller CT11 with the immersive presentation device 11 worn, while viewing an image presented on the immersive presentation device 11. That is to say, the user does not operate while directly visually recognizing the controller CT11. The controller CT11 may preferably have a simple configuration so that the controller CT11 is operable without direct visual recognition.

Thus, a plurality of operations is allocated to the touch pad 121. In other words, the touch pad 121 serves as an apparatus that facilitates operations such as tracing or tapping with a finger, even with a position relatively inaccurately verified; moreover, pre-allocation of a plurality of operations to such a touch pad 121 makes it possible to simply issue instructions for the operations.

Figure 10:
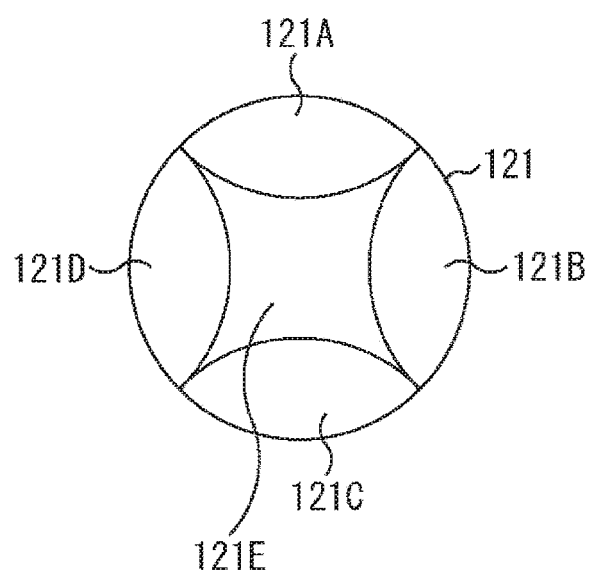
FIG. 10 is an explanatory illustration of regions on the controller.

For example, as illustrated in FIG. 10, the touch pad 121 is divided into five regions. It is assumed that the upper part of the touch pad 121 is a region 121A, the right part of the touch pad 121 is a region 121B, the lower part of the touch pad 121 is a region 121C, the upper part of the touch pad 121 is a region 121D, and the central part of the touch pad 121 is a region 121E.

For example, tapping of the region 121A enables issuance of an instruction on addition or movement of a marker, tapping of the region 121B enables issuance of an instruction on movement to a previous clip, and tapping of the region 121C enables issuance of an instruction on reproduction stop, tapping of the region 121D enables issuance of an instruction on movement to a next clip, and tapping of the region 121E enables issuance of an instruction on reproduction or pausing.

Alternatively, an instruction may be issued by tracing a plurality of regions 121. For example, tracing of the region 121D to the region 121B with a finger (movement of a finger from left to right) may enable issuance of an instruction on fast forward, and tracing of the region 121D from the region 121B with a finger (movement of a finger from right to left) may enable issuance of an instruction on rewinding.

Such operations each are simple operations that can be performed without directly visually recognizing the controller CT11. Such operations are allocated to the touch pad 121 of the controller CT11 by dividing into the regions. A mechanism for this allocation settable (customizable) by the user may be provided.

Furthermore, combination of the operations of the buttons 122 and 123 and the touch pad 121 may enable issuance of a new operation instruction. For example, instructions may be pre-allocated, for example, when the region 121A of the touch pad 121 is operated while pressing down the button 122, an instruction on deleting an attached marker is issued, and when the region 121B of the touch pad 121 is operated while pressing down the button 122, an instruction on fast forward at triple speed is issued.

Figure 11:
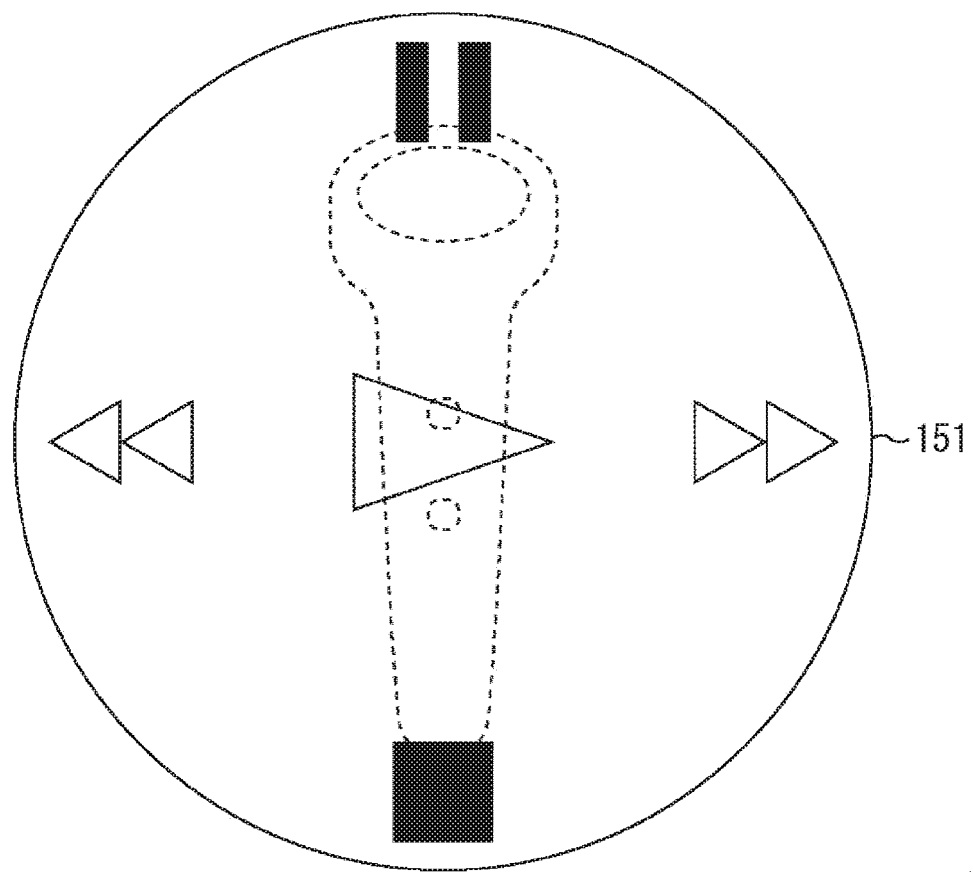
FIG. 11 is an explanatory illustration of a guidance display.

Furthermore, in order to make the user recognize an operation allocated to a predetermined region of the touch pad 121, guidance may be displayed as illustrated in FIG. 11. A guidance display 151 illustrated in FIG. 11 has marks each related to content reproduction which are displayed at positions corresponding to the respective regions 121A to 121E in a circle in which the shape of the touch pad 121 is copied.

A pause mark is displayed at a position corresponding to the region 121A; a mark for moving to a next mark (chapter) is displayed at a position corresponding to the region 121B; a mark for reproduction stop is displayed at a position corresponding to the region 121C; a mark for moving to a previous mark (chapter) is displayed at a position corresponding to the region 121D; and a reproduction mark is displayed at a position corresponding to the region 121E.

Such a guidance display 151 may be always displayed, or may be displayed, for example, when the touch pad 121 is touched. Furthermore, during display of the guidance display 151, for example, in a case where the button 122 is operated, guidance in the guidance display 151 may be changed.

Furthermore, for example, each of the marks regarding content reproduction is displayed on the guidance display 151 illustrated in FIG. 11; however, when the button 122 is operated, the mark may be switched to a mark for content editing.

In other words, switching between modes such as a reproduction mode and an editing mode may be made by operating the button 122, and guidance corresponding to such a mode may be displayed on the guidance display 151.

Note that here is exemplified the marks displayed in the guidance display 151; however, words other than the marks, for example, "reproduction" and "stop" may be displayed.

As another display example, a menu screen may be displayed when an operation unit to which an operation of displaying a menu of the touch pad 121, the button 122, or the button 123 is allocated is operated.

Figure 12:
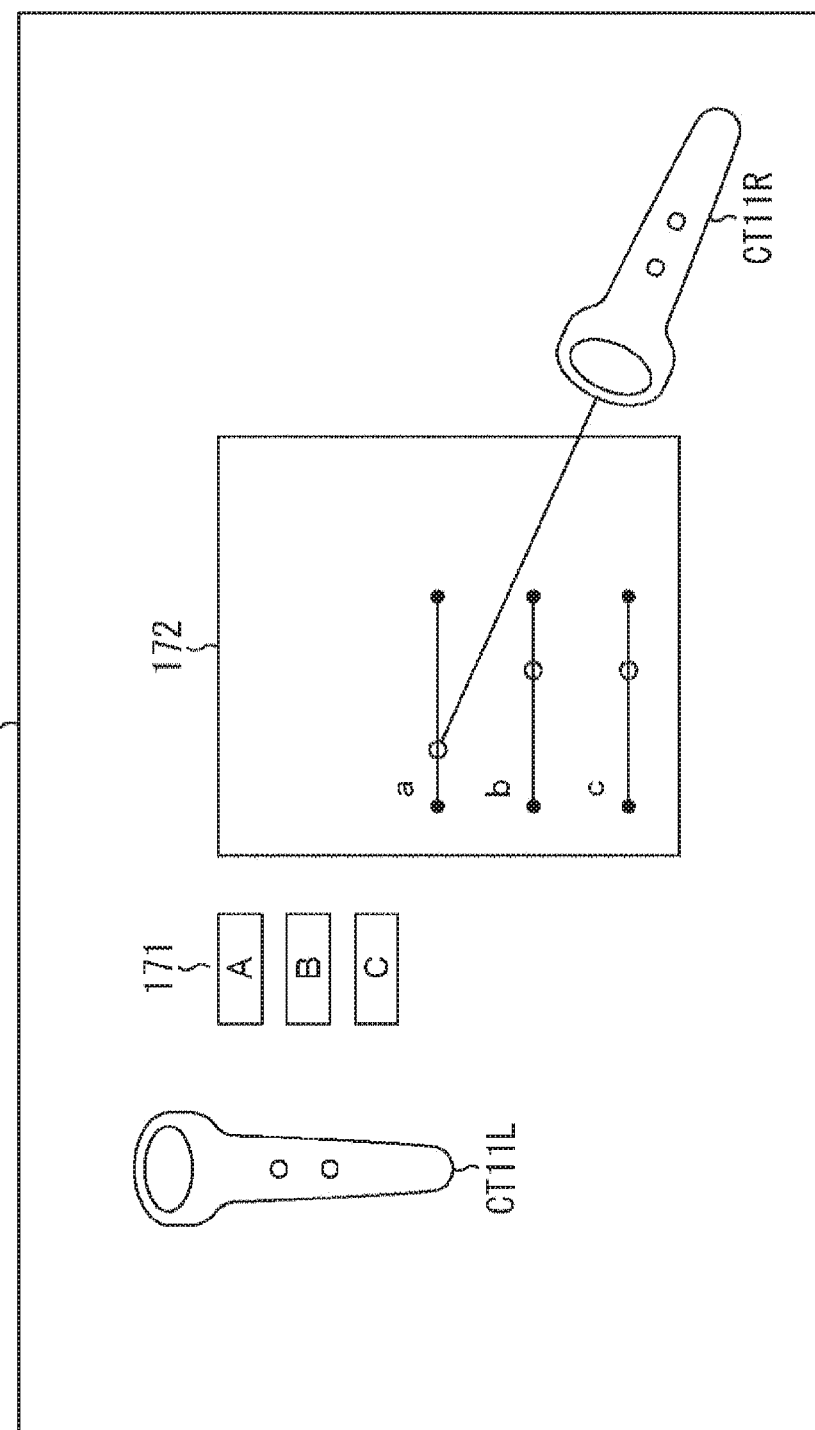
FIG. 12 is an explanatory illustration of display of a menu.

For example, as illustrated in FIG. 12, after a predetermined operation is performed, a menu 171 is displayed on the right side of the immersion-operation-unit model image CT11L representing the controller CT11L. In the example illustrated in FIG. 12, an "item A", an "item B", and an "item C" are displayed as the menu 171.

The user can select, with a controller CT11R, a desired item from the item A, the item B, and the item C displayed in the menu 171. In a case where the user, for example, desires to select the item B, the user adjusts, on the item B, the termination of the pointer 101 projected from the leading end of the controller CT11R (immersion-operation-unit model image CT11R). The item B may be selected only by adjustment, or the item B may be selected by operation of the button 122 or the button 123 after adjustment.

After an item desired by the user is selected from the menu 171, a sub-menu 172 is displayed on the right side of the menu 171. The sub-menu 172 displays more detailed selection items selected in the menu 171. In FIG. 12, an "item a", an "item b", and an "item c" are displayed. Operation for selecting a desired item by the user from the items in the sub-menu 172 is performed similarly to the operation for selecting a desired item from the items in the menu 171.

The menu 171 and the sub-menu 172 are disposed horizontally. The items in the menu 171 are disposed vertically, and the items in the sub-menu 172 are also disposed vertically. As described above, a direction in which the menu expands (in this case, horizontally) and a direction in which the items in the menu are arranged (in this case, vertically) are different directions.

Making the direction in which the menu expands different from the direction in which the items in the menu are arranged as described above allows reduction in the possibility of, for example, selecting an incorrect item. For example, supposing that the direction in which the menu expands and the direction in which the items in the menu are arranged are identical, the menu 171, the sub-menu 172, and the items in the sub-menu are placed horizontally.

As described above, the horizontal arrangement of the menu 171, the sub-menu 172, and the items in the sub-menu results in sequentially horizontal movement of (the leading end of) the controller CT11R. However, when the controller CT11R moves in the identical direction, for example, it is highly like to occur that the controller CT11R moves from the menu 171 to the sub-menu 172 and overshoots an item to be selected, due to the momentum, so that a different item may be erroneously selected.

However, as described above, making the direction in which the menu expands different from the direction in which the items in the menu are arranged results in difference between the direction in which the controller CT11R moves from the menu 171 to the sub-menu 172 and the direction in which the controller CT11R moves in the sub-menu 172. Thus, there can be prevented occurrence of, for example, movement from the menu 171 to the sub-menu 172 and overshooting of an item to be selected, due to the momentum.

Moreover, examples of operation with the controller CT11 include display and non-display of the see-through window SW11 with the controller CT11 described above (FIG. 3).

Figure 13:
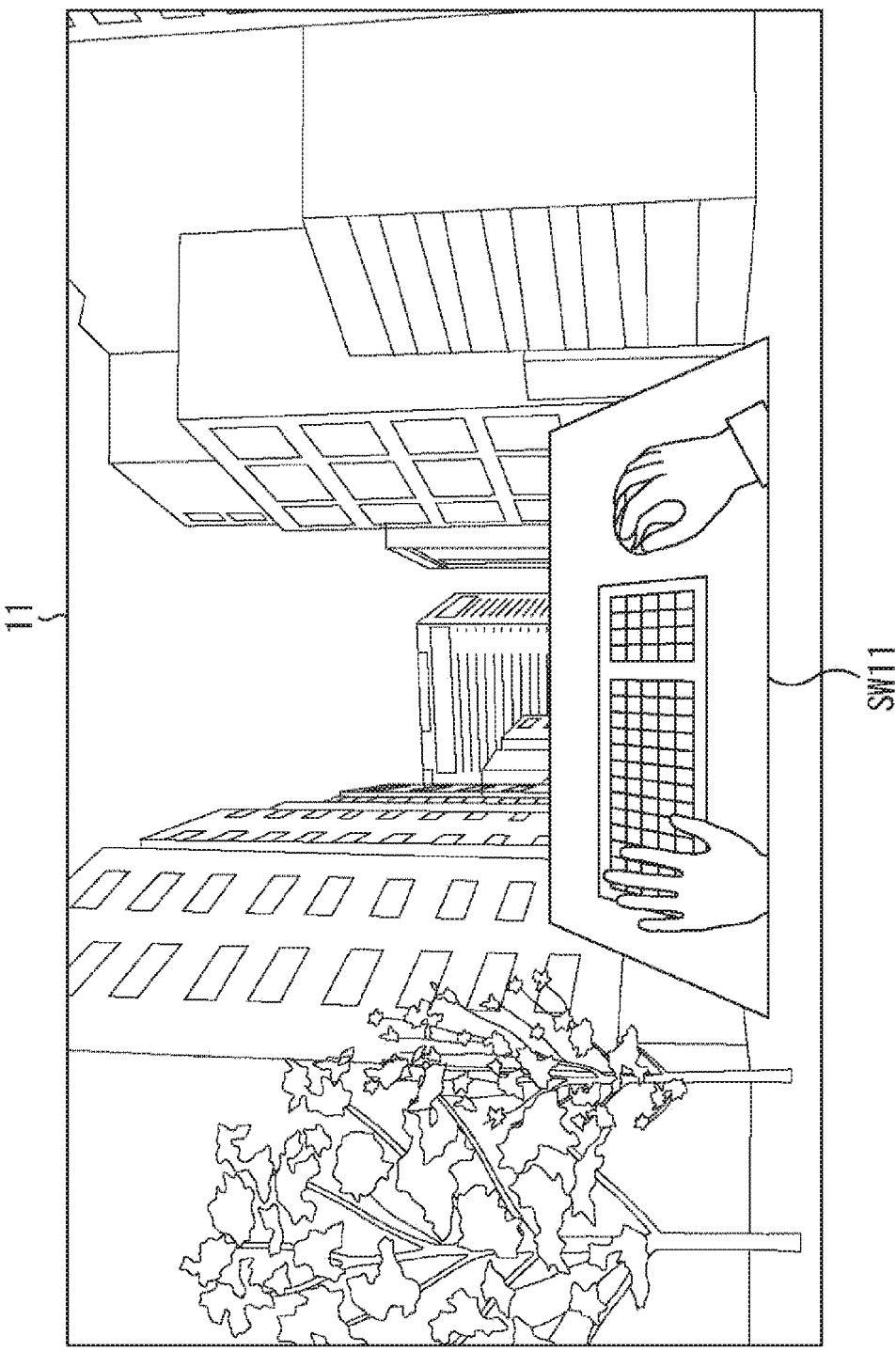
FIG. 13 is an illustration of exemplary display of the see-through window.

For example, with the see-through window SW11 non-displayed, for an operation for a display instruction, for example, in a case where the button 123 is a button for an instruction on display of the see-through window SW11, when the button 123 is operated, the see-through window SW11 is displayed on the spherical image for presentation. For example, as illustrated in FIG. 13, the see-through window SW11 is displayed at a predetermined position on the spherical image for presentation.

The user can operate the keyboard and the mouse, while viewing the see-through window SW11. In a case where the button 123 is operated with the see-through window SW11 displayed on the spherical image for presentation as described above, the see-through window SW11 may close.

Thus, according to the present technology, editing work can be performed more easily while verifying the spherical image. Furthermore, there can be provided a controller and a user interface suitable for such editing performed while verifying the spherical image.

<Editing Processing>

Meanwhile, as described above, for example, as described with reference to FIG. 7, in the case of moving the text 102 displayed on the spherical image, it is required to specify at which position on the spherical image the text 102 is displayed and to specify a position on the spherical image instructed as a movement destination.

Such processing will be described with reference to the flowcharts of FIGS. 14 and 15. Furthermore, here, the description will be continued by citing, as an example, a case of moving the text 102 displayed on the spherical image, for example, as described with reference to FIG. 7. Furthermore, here, processing regarding real-time update (processing that is always performed) will be described with reference to FIG. 14, and processing when the text 102 or the like is selected and the movement is instructed will be described with reference to FIG. 15.

Figure 14:
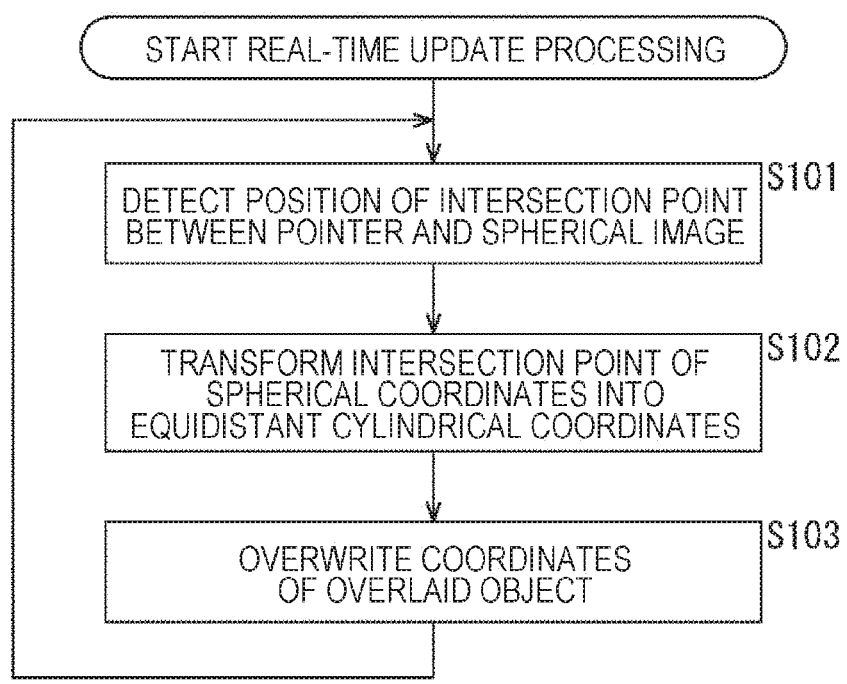
FIG. 14 is a flowchart for describing processing regarding real-time update.
Figure 15:
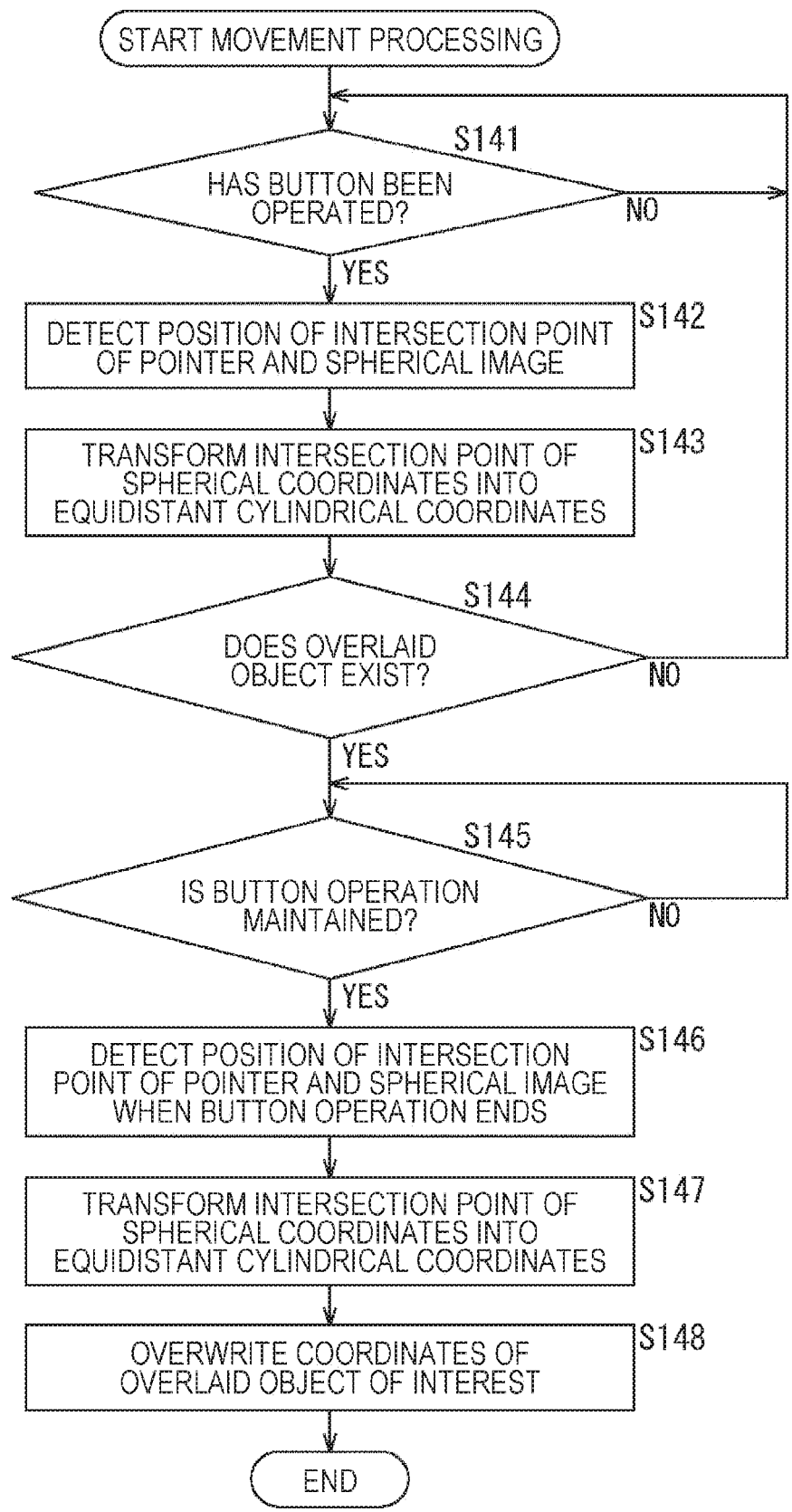
FIG. 15 is a flowchart for describing processing regarding movement.

The processing in the flowchart illustrated in each of FIGS. 14 and 15 is performed through reception of an operation from the immersion operation unit 14, decision of the details of the operation by the operation detection unit 32, and processing performed by the editing reflection processing unit 34.

Referring to the flowchart illustrated in FIG. 14, in step S101, the position of the intersection point between the pointer and the spherical image for presentation is detected. For example, during display of a spherical image for presentation such as illustrated in FIG. 7, at the time T1, the pointer 101 from the controller CT11 points to the position P1. Thus, the coordinates of the position P1 are detected.

In step S102, the intersection point of the spherical coordinates is transformed into coordinates in equidistant cylindrical projection (hereinafter, referred to as equidistant cylindrical coordinates). The spherical coordinates are coordinates in the spherical image for presentation, that is to say, coordinates in a 360-degree image. The equidistant cylindrical projection is a type of map projection, and since parallels and meridians intersect at right angles and at equal intervals, the equidistant cylindrical projection is a projection also called, grid projection, square projection, and the like. The equidistant cylindrical coordinates are the coordinates in such projection.

The coordinate transformation in step S102 can also be said to be processing of transforming three-dimensional coordinates into two-dimensional coordinates. Thus, different transformation may be performed as long as such processing of transforming three dimensions into two dimensions is performed. Furthermore, it is not always necessary to transform three-dimensional coordinates into two-dimensional coordinates to perform processing, and the processing can be performed with three-dimensional coordinates without such transformation.

For example, the user can also perform editing work with an equidistant cylindrical (equirectangular) two-dimensional spherical image obtained by the equidistant cylindrical projection displayed on the display 12. In order to be able to perform processing in the same manner as in a case where an editing work is performed on the two-dimensional image displayed on the display 12, the description will be continued here assuming that spherical coordinates are transformed into equidistant cylindrical coordinates.

That is to say, in a case where processing can be performed even with conventional software as software for editing a spherical image, transformation of the spherical coordinates into equidistant cylindrical coordinates allows obtaining coordinates that can be handled even with the software. Thus, as described above, for the use of software processable with three-dimensional coordinates, the processing in step S102 can be omitted, and the real-time update processing can be continued with the spherical coordinates.

Note that the description will be continued assuming that the coordinates are transformed into the coordinates in the equidistant cylindrical projection; however, the coordinates may be transformed into coordinates in a different type of projection.

In the processing of each of steps S101 and S102, the coordinates of a position pointed by the pointer at that point in time are obtained. As described above, with the controller CT11 used and the pointer 101 emergent, the position pointed by the pointer 101 is always grasped.

In step S103, the coordinates of an overlaid object are overwritten. For example, in the example of the spherical image for presentation illustrated in FIG. 7, the text 102 is overlaid. The coordinates of the text 102 are obtained, and the coordinates of the text 102 are overwritten on the obtained coordinates. For the coordinates of an overlaid object (e.g., text 102, mark, or image), the spherical coordinates can be transformed into to equidistant cylindrical coordinates to be overwritten onto the transformed equidistant cylindrical coordinates.

Thus, the coordinates of the overlaid object are also always managed. Note that, in the following description, it is assumed that the overlaid object is the text 102.

Repetition of such processing allows real-time management of the position pointed by the pointer 101 and the position of the overlaid object.

There will be described, with reference to FIG. 15, processing performed when an operation from the controller CT11 is performed, here, when the button 122 is operated, and the overlaid text 102 where the pointer 101 is located at that point in time moves, while such management is performed.

In step S141, it is determined whether or not the button 122 of the controller CT11 has been operated. A standby state is maintained until it is determined that the button 122 has been operated (the performance of the processing of the flowchart illustrated in FIG. 14 maintains the processing of real-time updata). On the other hand, in a case where it is determined that the button 122 has been operated, the movement processing proceeds to step S142.

In step S142, the position of the intersection point of the pointer and the spherical image is detected. Furthermore, in step S143, the intersection point of the spherical coordinates is transformed into equidistant cylindrical coordinates. The processing in each of steps S142 and S143 is performed similarly to the processing in each of steps S101 and S102 of the flowchart illustrated in FIG. 14.

In step S144, it is determined whether or not an overlaid object exists. The coordinates of the overlaid object, for example, the text 102, are updated at predetermined intervals in the processing in step S103 in FIG. 14. The determination processing in step S144 is performed by determining whether or not the coordinates of the position pointed by the pointer 101 obtained in the pieces of the processing to step S143 match the coordinates of the managed overlaid object.

In a case where it is determined in step S144 that no overlaid object exists, the movement processing returns to step S141, and the subsequent processing is repeated. Note that, even in a case where it is determined that no overlaid object exists because the button is being operated, processing to be performed due to the button operation is performed.

On the other hand, in a case where it is determined in step S144 that an overlaid object exists, the movement processing proceeds to step S145, and it is determined whether or not the button operation is maintained.

For example, as described with reference to FIG. 7, in the case where the text 102 moves with the operation of the controller CT11, the operation of drag and drop is performed. Thus, while the button operation is maintained, it can be determined that the overlaid text 102 has not moved to a desired position.

As a result, the determination processing in step S145 is repeated until it is determined in step S145 that the button operation is maintained. In step S145, in a case where it is determined that the button operation is not maintained, that is to say, in a case where it is determined that the user has released the button and the text 102 has been dropped, further that is to say, in a case where it is determined that the user has moved the text 102 to a desired position, the movement processing proceeds to step S146.

In step S146, the position of the intersection point of the position pointed by the pointer and the spherical image when the button operation ends is detected. In step S147, the intersection point of the spherical coordinates is transformed into equidistant cylindrical coordinates. The processing of each in steps S146 and S147 is performed basically similarly to the processing of each in steps S142 and S143. At this point in time, the text 102 has moved to the position desired by the user, that is, to the position P2 in FIG. 7, and has been displayed.

In step S148, the coordinates of the overlaid object of interest are overwritten. In other words, in this case, the coordinates of the text 102 are rewritten to the coordinates of the movement destination. In such a manner, a position (coordinates) such as text or a mark that is overlaid is managed.

As described above, the immersion-operation-unit model image obtained by copying the controller CT11 in the real space is displayed on the spherical image for presentation in the virtual space, and a position where the pointer from the controller CT11 points in the spherical image for presentation is detected, so that the operation from the user is received and processed.

Thus, editing work can be performed more easily while verifying the spherical image. Furthermore, there can be provided a controller and a user interface suitable for such editing performed while verifying the spherical image.

<Exemplary Configuration of Computer>

Meanwhile, the series of pieces of processing described above can be performed by hardware or software. For performance of the series of pieces of processing by software, a program included in the software is installed in a computer. Here, examples of the computer include, a computer embedded in dedicated hardware, and a general-purpose computer executable for various functions with installation of various programs.

Figure 16:
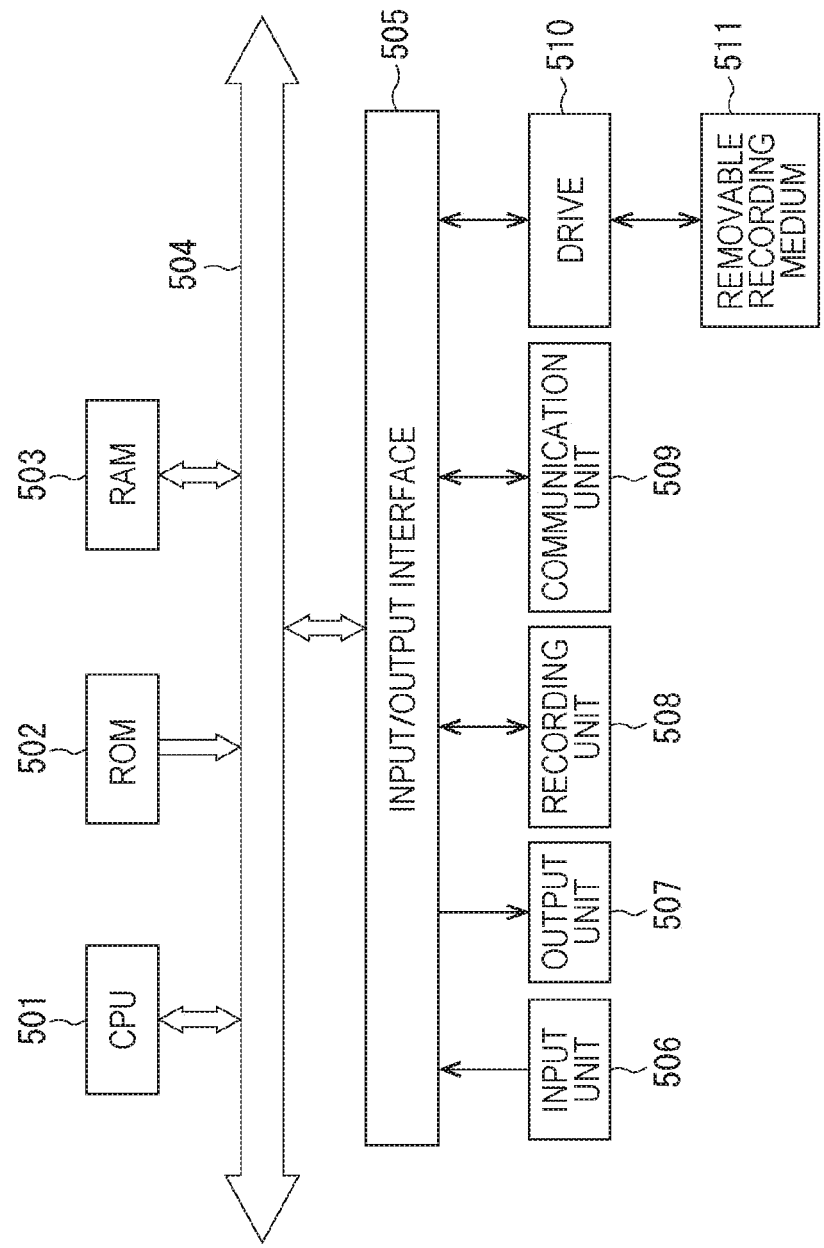
FIG. 16 is a block diagram of an exemplary configuration of a computer.

FIG. 16 is a block diagram of an exemplary hardware configuration of a computer that executes the series of pieces of processing described above, in accordance with a program.

In the computer, a central processing unit (CPU) 501, a read only memory (ROM) 502, and a random access memory (RAM) 503 are mutually connected through a bus 504.

Moreover, an input/output interface 505 is connected to the bus 504. An input unit 506, an output unit 507, a recording unit 508, a communication unit 509, and a drive 510 each are connected to the input/output interface 505.

The input unit 506 includes a keyboard, a mouse, a microphone, an imaging element, and the like. The output unit 507 includes a display, a speaker, and the like. The recording unit 508 includes a hard disk, a non-volatile memory, and the like. The communication unit 509 includes, for example, a network interface. The drive 510 drives a removable recording medium 511 such as a magnetic disk, an optical disk, a magneto-optical disk, or a semiconductor memory.

For the computer having a configuration as described above, the CPU 501 loads, for example, a program recorded in the recording unit 508 into the RAM 503 through the input/output interface 505 and the bus 504, and executes the program, whereby the series of pieces of processing is performed.

The program executed by the computer (CPU 501) can be provided by being recorded on, for example, the removable recording medium 511 as a package medium or the like. Furthermore, the program can be provided through a wired or wireless transmission medium such as a local area network, the Internet, or digital satellite broadcasting.

In the computer, the program can be installed in the recording unit 508 through the input/output interface 505 by attaching the removable recording medium 511 to the drive 510. Furthermore, the program can be received by the communication unit 509 through a wired or wireless transmission medium and installed in the recording unit 508. Besides, the program can be preinstalled in the ROM 502 or the recording unit 508.

Note that the program executed by the computer may be a program for performing processing chronologically according to the order described in the present specification, may be a program for performing parallel processing or a program for performing processing at a required timing, for example, when a call is made.

Furthermore, the embodiment of the present disclosure is not limited to the above-described embodiment, and various modifications can be made without departing from the gist of the present technology.

For example, the present technology can have a cloud computing configuration in which one function is shared and processed by a plurality of apparatuses through a network.

Furthermore, each step described in the above-described flowcharts can be performed by one apparatus, and can be shared and performed by a plurality of apparatuses.

Moreover, in a case where a plurality of pieces of processing is included in one step, the plurality of pieces of processing included in the one step can be performed by one apparatus, and can be shared and performed by a plurality of apparatuses.

Furthermore, the effects described in the present specification are merely exemplified and are not intended to be limiting, and may have additional effects.

Moreover, the present technology can also have the following configurations.

(1)

An image processing apparatus including:

an operation detection unit configured to detect an operation input by an operation unit; and a display control unit configured to output, to an immersive presentation device, part or entirety of a spherical image on which an image of the operation unit is superimposed, as a presentation image, to cause the immersive presentation device to display the presentation image, the display control unit being configured to control, in a case where the operation input has been detected, the display of the presentation image such that the operation input is reflected.

(2)

The image processing apparatus according to (1), in which the operation detection unit detects the operation input regarding editing of the spherical image.

(3)

The image processing apparatus according to (1) or (2), further including:

an image processing unit configured to generate the image of the operation unit, on the basis of a captured image of the operation unit captured as a subject.

(4)

The image processing apparatus according to (3), in which the display control unit causes the image of the operation unit to be displayed at a position on the spherical image defined by a position and orientation of the immersive presentation device.

(5)

The image processing apparatus according to (1) or (2), further including:

an image processing unit configured to generate an image of a model of the operation unit, as the image of the operation unit.

(6)

The image processing apparatus according to (5), in which the display control unit causes the image of the operation unit to be displayed at a position on the spherical image defined by a position and orientation of the operation unit.

(7)

The image processing apparatus according to any one of (1) to (6), in which an auxiliary screen for editing the spherical image is further displayed on the presentation image.

(8)

The image processing apparatus according to (7), in which the auxiliary screen is displayed at a defined position on the presentation image.

(9)

The image processing apparatus according to (7), in which the auxiliary screen is displayed at a position on the presentation image defined by a position and orientation of the immersive presentation device.

(10)

The image processing apparatus according to any one of (1) to (9), further including:

a communication unit configured to output the presentation image to a plurality of the immersive presentation devices.

(11)

An image processing method including the steps of:

detecting an operation input by an operation unit; and outputting, to an immersive presentation device, part or entirety of a spherical image in which an image of the operation unit is superimposed, as a presentation image, to cause the immersive presentation device to display the presentation image, and controlling, in a case where the operation input has been detected, the display of the presentation image such that the operation input is reflected.

(12)

A program for causing a computer to execute processing including the steps of:

detecting an operation input by an operation unit; and outputting, to an immersive presentation device, part or entirety of a spherical image on which an image of the operation unit is superimposed, as a presentation image, to cause the immersive presentation device to display the presentation image, and controlling, in a case where the operation input has been detected, the display of the presentation image such that the operation input is reflected.

REFERENCE SIGNS LIST

11 Immersive presentation device
12 Display
13 Input device
14 Immersion operation unit
15 Image processing apparatus
32 Operation detection unit
33 Retaining unit
34 Editing reflection processing unit
35 Renderer unit
36 Communication unit
121 Touch pad
122, 123 Button

The invention claimed is:

1. An image processing apparatus, comprising: circuitry configured to:

control an immersive presentation device to display a spherical image; superimpose an image of a control device on the spherical image to generate a presentation image representing the image of the control device in the immersive presentation device, wherein the presentation image includes an auxiliary screen that comprises a plurality of buttons, and each button of the plurality of buttons is associated with a corresponding edit operation of the spherical image;

control the immersive presentation device to display the presentation image;

detect an operation input from the control device, wherein the operation input corresponds to selection of at least one button of the plurality of buttons in the auxiliary screen such that the operation input is reflected on the presentation image; and edit, based on the detected operation input associated with the edit, the spherical image in the presentation image displayed on the immersive presentation device.

2. The image processing apparatus according to claim 1, wherein the circuitry is further configured to:

generate the image of the control device based on a captured image of the control device, wherein the control device is captured as a subject in the captured image.

3. The image processing apparatus according to claim 2, wherein the circuitry is further configured to:

control display of the image of the control device at a specific position on the spherical image, wherein the specific position of the image of the control device is based on a position of the immersive presentation device and an orientation of the immersive presentation device.

4. The image processing apparatus according to claim 1, wherein the circuitry is further configured to:

generate an image of a model of the control device as the image of the control device.

5. The image processing apparatus according to claim 4, wherein the circuitry is further configured to:

control display of the image of the control device at a specific position on the spherical image, and wherein the specific position is based on a position of the control device and an orientation of the control device.

6. The image processing apparatus according to claim 1, wherein the auxiliary screen is at a specific position on the presentation image.

7. The image processing apparatus according to claim 1, wherein the auxiliary screen is at a specific position on the presentation image, and the specific position is based on a position of the immersive presentation device and an orientation of the immersive presentation device.

8. The image processing apparatus according to claim 1, wherein the circuitry is further configured to:

output the presentation image to a plurality of immersive presentation devices.

9. The image processing apparatus according to claim 1, the circuitry is further configured to detect the operation input based on a position of the immersive presentation device and an orientation of the immersive presentation device.

10. An image processing method, comprising:
   in an image processing apparatus:
      controlling an immersive presentation device to display a spherical image;
      superimposing an image of a control device on the spherical image to generate a presentation image representing the image of the control device in the immersive presentation device, wherein the presentation image includes an auxiliary screen that comprises a plurality of buttons, and each button of the plurality of buttons is associated with a corresponding edit operation of the spherical image;
      controlling the immersive presentation device to display the presentation image;
      detecting an operation input from the control device, wherein the operation input corresponds to selection of at least one button of the plurality of buttons in the auxiliary screen such that the operation input is reflected on the presentation image; and
      editing, based on the detected operation input associated with the edit, the spherical image in the presentation image displayed in the immersive presentation device.

11. A non-transitory computer-readable medium having stored thereon computer-executable instructions which, when executed by a computer, cause the computer to execute operations, the operations comprising:
   controlling an immersive presentation device to display a spherical image; superimposing an image of a control device on the spherical image to generate a presentation image representing the image of the control device in the immersive presentation device, wherein the presentation image includes an auxiliary screen that comprises a plurality of buttons, and each button of the plurality of buttons is associated with a corresponding edit operation of the spherical image;
   controlling the immersive presentation device to display the presentation image;
   detecting an operation input from the control device, wherein the operation input corresponds to selection of at least one button of the plurality of buttons in the auxiliary screen such that the operation input is reflected on the presentation image; and
   editing, based on the detected operation input associated with the edit, the spherical image in the presentation image displayed on the immersive presentation device.

* * * * *